US007986346B2

(12) United States Patent
Kaneda et al.

(10) Patent No.: US 7,986,346 B2
(45) Date of Patent: Jul. 26, 2011

(54) IMAGE CAPTURING APPARATUS, CONTROL METHOD THEREFOR, PROGRAM, AND STORAGE MEDIUM

(75) Inventors: Yuji Kaneda, Kawasaki (JP); Masakazu Matsugu, Yokohama (JP); Katsuhiko Mori, Kawasaki (JP); Hiroshi Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 641 days.

(21) Appl. No.: 11/935,803

(22) Filed: Nov. 6, 2007

(65) Prior Publication Data
US 2008/0117310 A1 May 22, 2008

(30) Foreign Application Priority Data

Nov. 17, 2006 (JP) .................................. 2006-312127

(51) Int. Cl.
  H04N 5/228 (2006.01)
  G06K 9/46 (2006.01)
  G03B 17/00 (2006.01)
(52) U.S. Cl. ...................... 348/222.1; 382/190; 396/263
(58) Field of Classification Search .................... 348/77, 348/78, 143, 211.4, 211.5, 211.6, 220.1, 348/222.1, 231.99, 231.2, 231.3, 169; 382/190; 396/263
See application file for complete search history.

(56) References Cited

U.S. PATENT DOCUMENTS

| | | | |
|---|---|---|---|
| 7,084,918 B2 * | 8/2006 | Robins et al. | 348/333.03 |
| 7,233,684 B2 * | 6/2007 | Fedorovskaya et al. | 382/118 |
| 7,623,678 B2 * | 11/2009 | Masaki | 382/103 |
| 2007/0195174 A1 * | 8/2007 | Oren | 348/222.1 |
| 2010/0039527 A1 * | 2/2010 | Kretz et al. | 348/222.1 |

FOREIGN PATENT DOCUMENTS

| | | |
|---|---|---|
| JP | 05-046583 | 2/1993 |
| JP | 07-057103 | 3/1995 |
| JP | 07-302328 | 11/1995 |
| JP | 08-249447 | 9/1996 |
| JP | 08-266468 | 10/1996 |
| JP | 2001-051338 | 2/2001 |
| JP | 2003-107574 | 4/2003 |

OTHER PUBLICATIONS

Yann LeCun and Yoshua Bengio, "Convolutional Networks for Images, Speech, and Time Series", The Handbook of Brain Theory and Neural Networks, pp. 1-14, 1995.
Paul Viola and Michael Jones, "Rapid object detection using a Boosted Cascade of Simple Features", Proc. of IEEE Conf. CVPR, 1, pp. 1-9, 2001.

* cited by examiner

*Primary Examiner* — David Ometz
*Assistant Examiner* — Peter Chon
(74) *Attorney, Agent, or Firm* — Cowan, Liebowitz & Latman, P.C.

(57) ABSTRACT

An image capturing apparatus includes an image input unit which photo-electrically converts an object image to generate an image signal, a status determination unit which determines an object status in an image generated by the image input unit, an automatic image capturing instruction unit which starts an automatic image capturing operation as an operation to automatically store the image generated by the image input unit in the first storage unit when the object status determined by the status determination unit satisfies a predetermined automatic image capturing condition, and a shooting control unit which automatically stores the image generated by the image input unit in the second storage unit when the object status does not satisfy the automatic image capturing condition even upon the lapse of a predetermined time after the automatic image capturing instruction unit designates the automatic image capturing operation.

10 Claims, 20 Drawing Sheets

F I G. 20
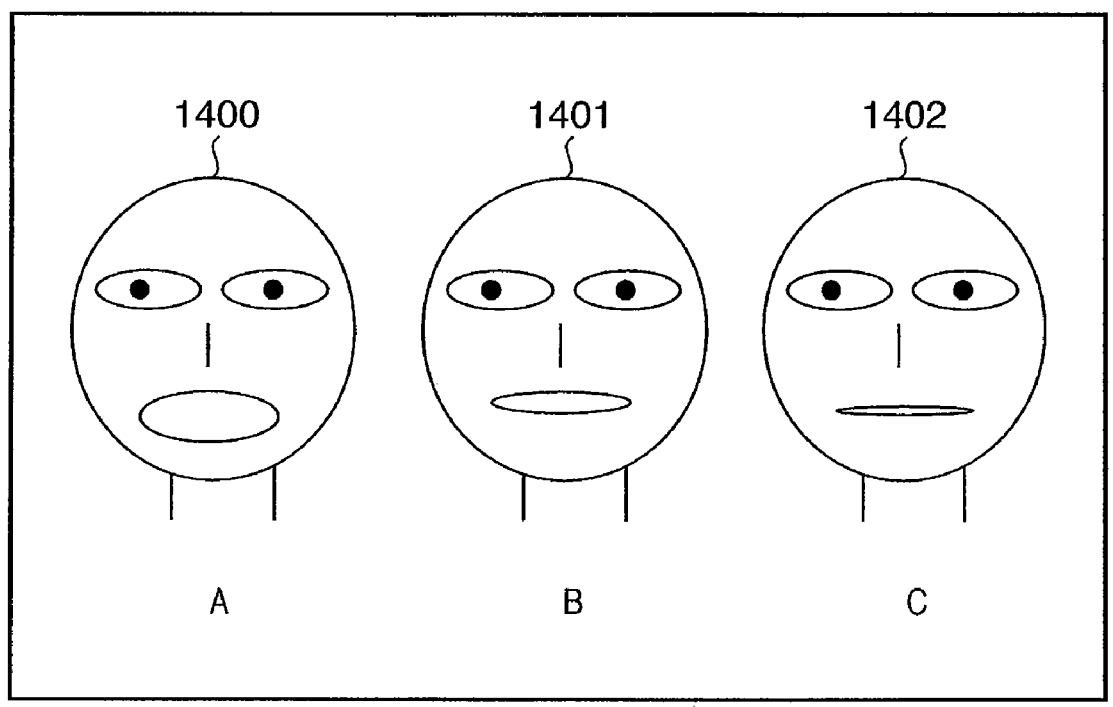

IMAGE CAPTURING APPARATUS, CONTROL METHOD THEREFOR, PROGRAM, AND STORAGE MEDIUM

BACKGROUND OF THE INVENTION

1. Field of the Invention

The present invention relates to a technique of automatically capturing an image by recognizing an object status from an image.

2. Description of the Related Art

There has conventionally been known a technique of automatically capturing an image by recognizing an object status from an image. As a concrete technique, an image is automatically captured when the object status is recognized from an image to detect that the object faces the front or takes a predetermined action, posture, pose, or facial expression (see Japanese Patent Laid-Open No. 2001-51338).

As another technique, an image is shot when an object stands still for a predetermined time. Alternatively, when an object stands still for a predetermined time, he is given a sign to start shooting. If the object keeps still for another predetermined time, an image is shot (see Japanese Patent Laid-Open No. 2003-107574).

To recognize the state of a specific object such as a person after detecting the specific object, more detailed information is extracted from image data of the specific object. In this case, however, recognition processing may not be executed accurately under the influence of various factors.

For example, recognition fails when the face size of an object is small and there is little information for recognizing a face expression and state, or when recognition is affected by the shadow of illumination or accessories such as sunglasses. When a plurality of objects are to be photographed, the same recognition processing is executed a plurality of number of times. Recognition processing sometimes fails for a given object, and no automatic image capturing is executed.

If no image recognition is accurately achieved under the influence of a variety of factors, no image may be shot though automatic image capturing conditions are satisfied in practice. In some cases, a very long time is taken to perform automatic image capturing.

SUMMARY OF THE INVENTION

The present invention has been made to overcome the conventional drawbacks, and has as its object to avoid a situation in which no image is shot when an image is automatically captured by recognizing an object status from an image. It is another object of the present invention to avoid a situation in which a very long time is taken to perform automatic image capturing.

In order to solve the above problems and to achieve the above objects, according to the first aspect of the present invention, there is provided an image capturing apparatus comprising an image input unit which photo-electrically converts an object image to generate an image signal, a status determination unit which determines an object status in an image generated by the image input unit, an automatic image capturing instruction unit which starts an automatic image capturing operation as an operation to automatically store the image generated by the image input unit in a first storage unit when the object status determined by the status determination unit satisfies a predetermined automatic image capturing condition, and a shooting control unit which automatically stores the image generated by the image input unit in a second storage unit when the object status does not satisfy the automatic image capturing condition even upon lapse of a predetermined time after the automatic image capturing instruction unit designates the automatic image capturing operation, wherein when the object status does not satisfy the automatic image capturing condition even upon lapse of the predetermined time after the automatic image capturing instruction unit designates the automatic image capturing operation, the shooting control unit stores, in the first storage unit, an image selected in accordance with the automatic image capturing condition from images which are generated by the image input unit after the automatic image capturing instruction unit designates the automatic image capturing operation, and are stored in the second storage unit.

According to the second aspect of the present invention, there is provided a method of controlling an image capturing apparatus having an image input unit which photo-electrically converts an object image to generate an image signal, the method comprises a status determination step of determining an object status in an image generated by the image input unit, an automatic image capturing instruction step of starting an automatic image capturing operation as an operation to automatically store the image generated by the image input unit in a first storage unit when the object status determined in the status determination step satisfies a predetermined automatic image capturing condition, and a shooting control step of automatically storing the image generated by the image input unit in a second storage unit when the object status does not satisfy the automatic image capturing condition even upon lapse of a predetermined time after the automatic image capturing operation is designated in the automatic image capturing instruction step, wherein in the shooting control step, when the object status does not satisfy the automatic image capturing condition even upon lapse of the predetermined time after the automatic image capturing operation is designated in the automatic image capturing instruction step, an image selected in accordance with the automatic image capturing condition from images which are generated by the image input unit after the automatic image capturing operation is designated in the automatic image capturing instruction step, and are stored in the second storage unit is stored in the first storage unit.

Further features of the present invention will become apparent from the following description of exemplary embodiments with reference to the attached drawings.

BRIEF DESCRIPTION OF THE DRAWINGS

FIG. 20 is a view showing the faces of objects.

DESCRIPTION OF THE EMBODIMENTS

Preferred embodiments of the present invention will be described in detail below with reference to the accompanying drawings.

First Embodiment

Figure 1:
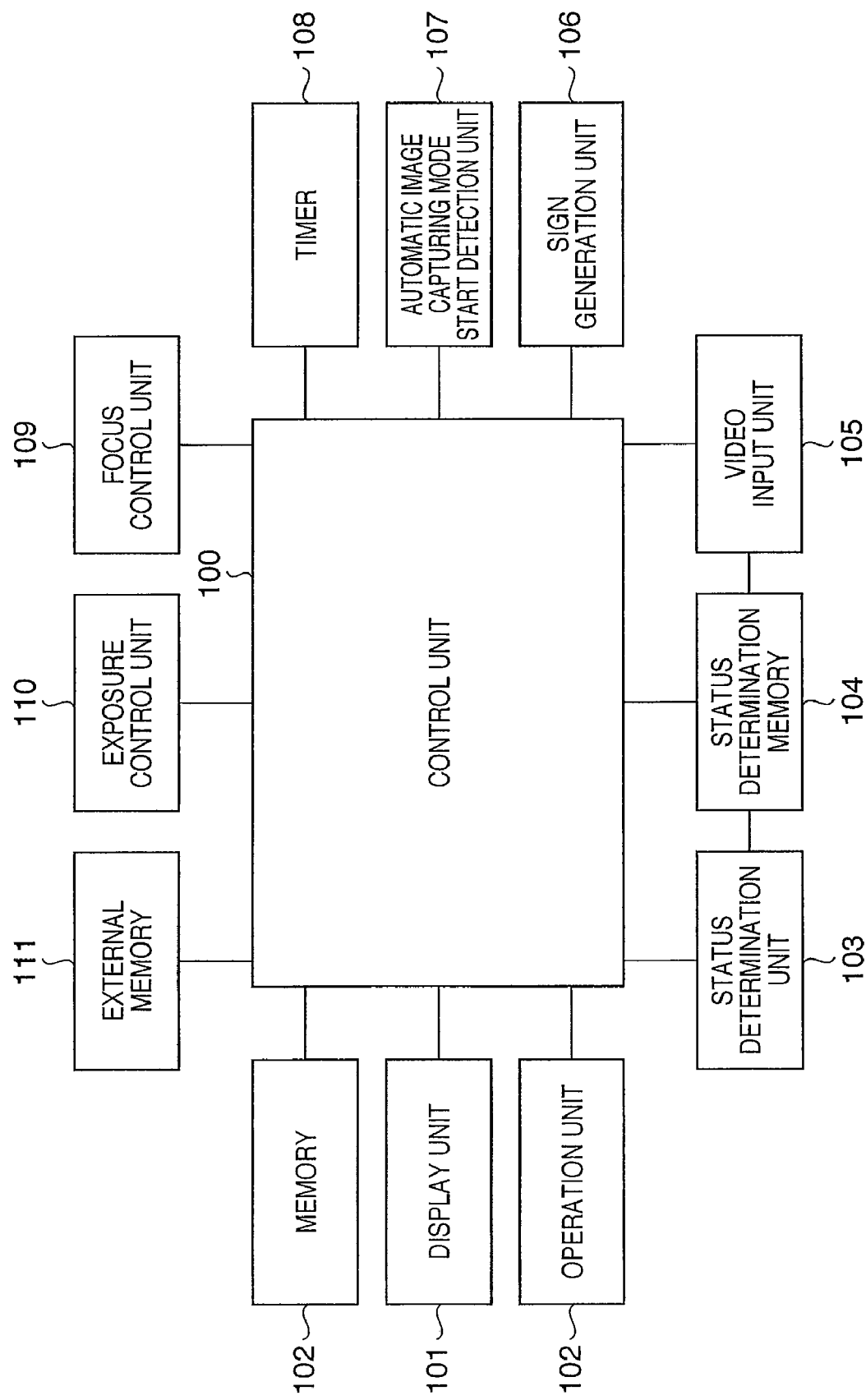
FIG. 1 is a block diagram showing the arrangement of an image capturing apparatus according to the first embodiment of the present invention.

FIG. 1 is a block diagram showing the arrangement of an image capturing apparatus according to the first embodiment of the present invention. A control unit 100 controls the overall image capturing apparatus. The control unit 100 controls to operate, at proper timings, a display unit 101, operation unit 102, status determination unit 103, status determination memory 104, video input unit 105, sign generation unit 106, automatic image capturing mode start detection unit 107, and the like. The control unit 100 also controls a timer 108, focus control unit 109, exposure control unit 110, external memory 111, memory 112, and the like.

Figure 2:
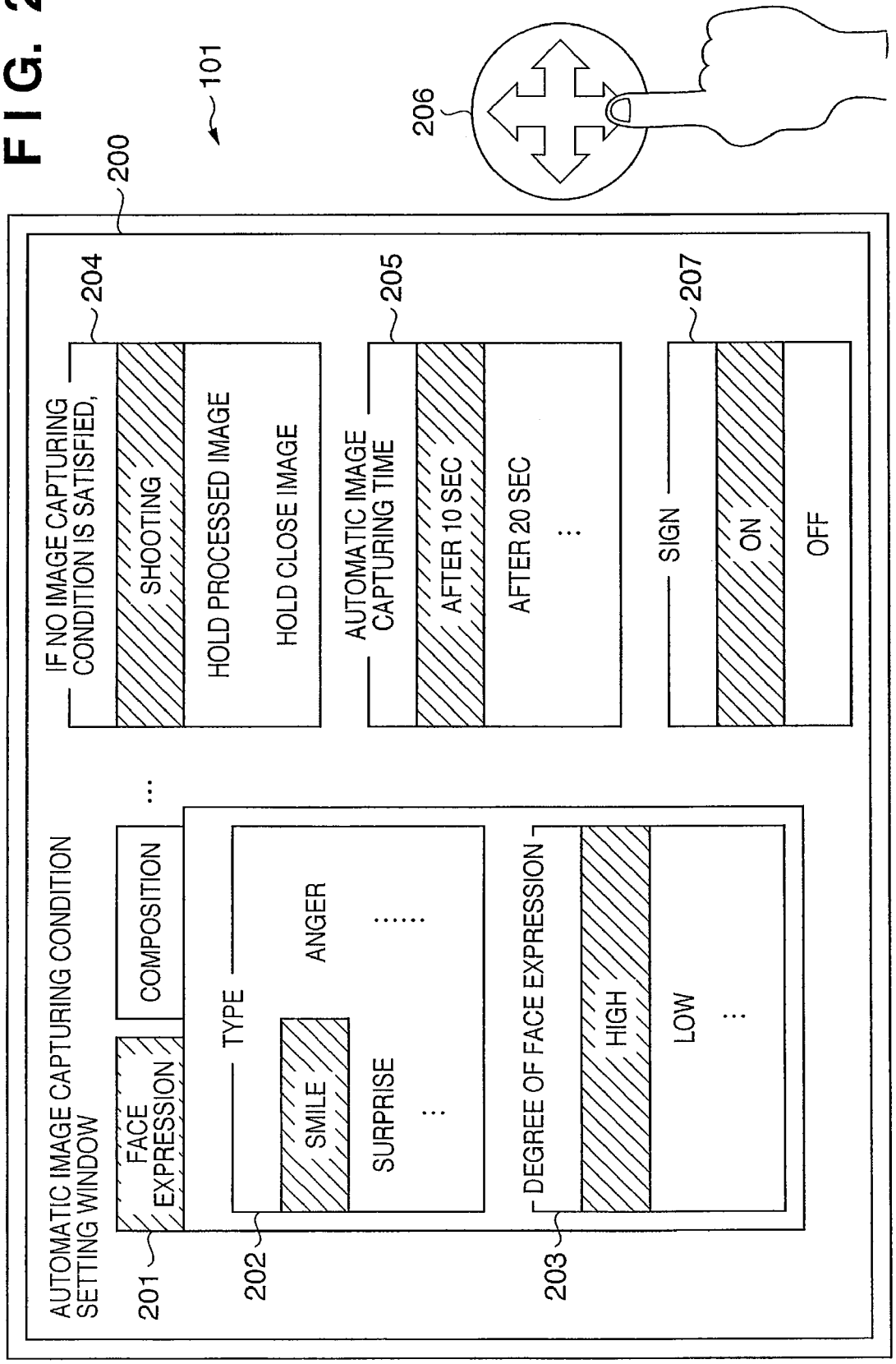
FIG. 2 is a view showing a setting interface and cross button according to the first embodiment.

The display unit 101 is used as an interface 200 to display a window for setting automatic image capturing conditions, as shown in FIG. 2. The display unit 101 also displays an image obtained from the video input unit 105 and an automatic captured image.

The operation unit 102 includes a cross button 206 as shown in FIG. 2. The user operates the cross button 206 or the like to set setting items 201 to 203 and set automatic image capturing conditions such as the face expression and its degree. The user also sets a predetermined time setting item 205, and a setting item 204 for an operation executed when set conditions are satisfied but no automatic image capturing is performed for a predetermined time after detecting the start of the automatic image capturing mode. The user also sets a setting item 207 for determining whether to give a sign before the start of automatic image capturing or after the end of it.

In the first embodiment, images are always input to the video input unit 105. An image extracted from images always input to the video input unit 105 in order to store it in the memory 112 will be called a processed image. An image input to the video input unit 105 by a normal shooting operation by opening/closing a shutter which shields the video input unit 105 from incident light will be called a shot image. Automatic image capturing is to hold the processed image or shot image in the memory 112 or external memory 111. An image which does not completely satisfy automatic image capturing conditions but marginally satisfies them will be called a close image.

The status determination unit 103 detects the presence/absence of a person or face from a digital image held in the status determination memory 104. Then, the status determination unit 103 determines a status such as the face expression, action, posture, or pose.

The status determination memory 104 holds digital images used for status determination processing. The digital image is prepared by converting the resolution of a processed image stored in the memory 112 to decrease the number of pixels.

The video input unit 105 comprises a lens, an image sensor (e.g., a CMOS (Complimentary Metal Oxide Semiconductor) sensor or CCD (Charge-Coupled Device)), an A/D converter, and an image processing circuit. The video input unit 105 uses the image sensor to photo-electrically convert an object image formed via the lens, generating an image signal.

The sign generation unit 106 is an interface which gives a sign to a photographer or user immediately before executing automatic image capturing upon the lapse of a predetermined time, or immediately after holding a close image. The sign generation unit 106 gives a sign to a user by using the light, flash, loudspeaker, or the like.

The automatic image capturing mode start detection unit 107 is an interface which detects the start of the automatic image capturing mode when the user presses a shutter button included in the operation unit 102.

The timer 108 starts operating when the automatic image capturing mode start detection unit 107 detects the start of automatic image capturing. When automatic image capturing conditions set via the operation unit 102 are not satisfied for a predetermined time after the start of the timer operation and no automatic image capturing is done, the timer 108 instructs the control unit 100 to shoot an image a predetermined time after the start of the timer operation. Alternatively, the timer 108 sends a signal to the control unit 100 to hold a close image in the external memory 111.

Figure 3:
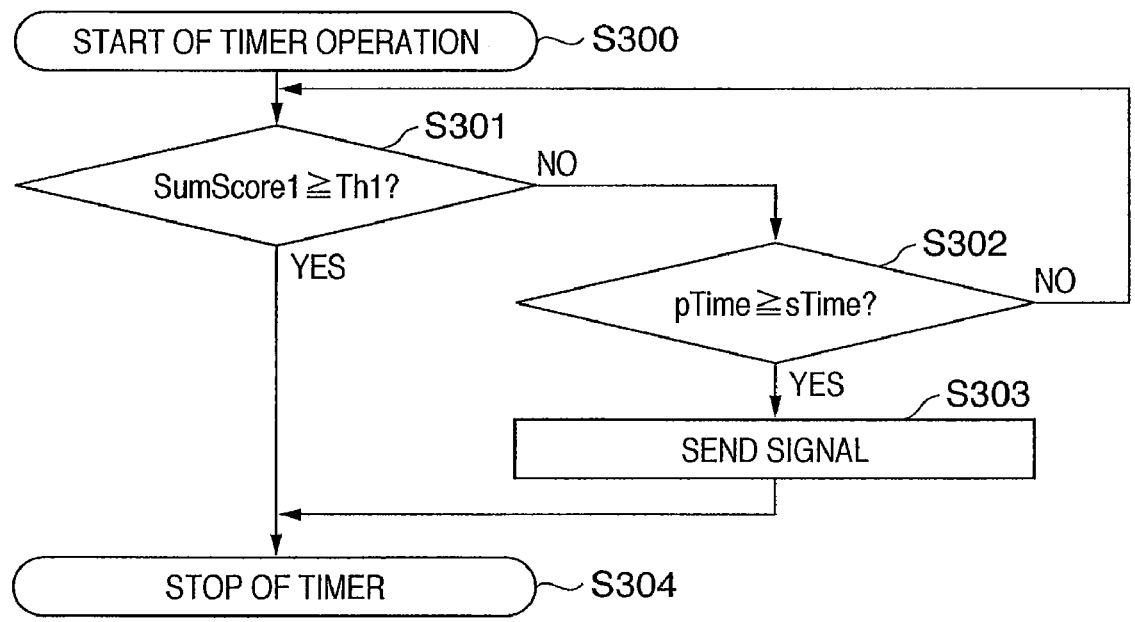
FIG. 3 is a flowchart showing the operation of a timer.

FIG. 3 is a flowchart showing the operation of the timer 108.

If the automatic image capturing mode start detection unit 107 detects that the user has pressed the shutter button to designate the start of the automatic image capturing mode, the timer operation starts in step S300.

If the status determination result of the status determination unit 103 satisfies a condition set to perform automatic image capturing, e.g., if a score SumScore1 (to be described later) of smile expression is equal to or higher than a predetermined threshold Th1 in step S301, the process advances to step S304. The timer 108 receives a timer stop signal from the control unit 100, and stops.

If the determination result of the status determination unit 103 does not satisfy the condition set to perform automatic image capturing, e.g., if the score SumScore1 (to be described later) of smile expression is lower than the predetermined threshold Th1, the process advances to step S302. It is determined whether an automatic image capturing time sTime (set to, e.g., 10 sec in FIG. 2) set via the operation unit 102 has elapsed. If the predetermined time sTime or longer has elapsed after the start of the timer operation, the timer 108 sends a signal to the control unit 100 in step S303 to designate automatic image capturing or hold a close image in the external memory 111.

In step S304, the timer 108 receives a timer stop signal from the control unit 100, and stops.

In the first embodiment and the second to fifth embodiments (to be described later), pTime represents the time elapsed after the start of the timer operation. sTime represents the time set to execute automatic image capturing or hold a close image in the external memory 111 a predetermined time after the start of the timer operation when no automatic image capturing condition is satisfied and no automatic image capturing is done for a predetermined time after the start of the timer operation.

The focus control unit 109 controls focusing and zooming of lenses.

The exposure control unit 110 adjusts the light amount of the aperture stop or the like, and controls the shutter speed.

The external memory 111 is a flash memory or the like. The external memory 111 is inserted into the automatic image capturing apparatus according to the embodiment, and holds an automatic captured image or close image via a memory interface.

The memory 112 holds programs and data for the control unit 100, and images obtained by the video input unit 105.

A series of operations by the main part of the automatic image capturing apparatus will be explained.

Figure 4:
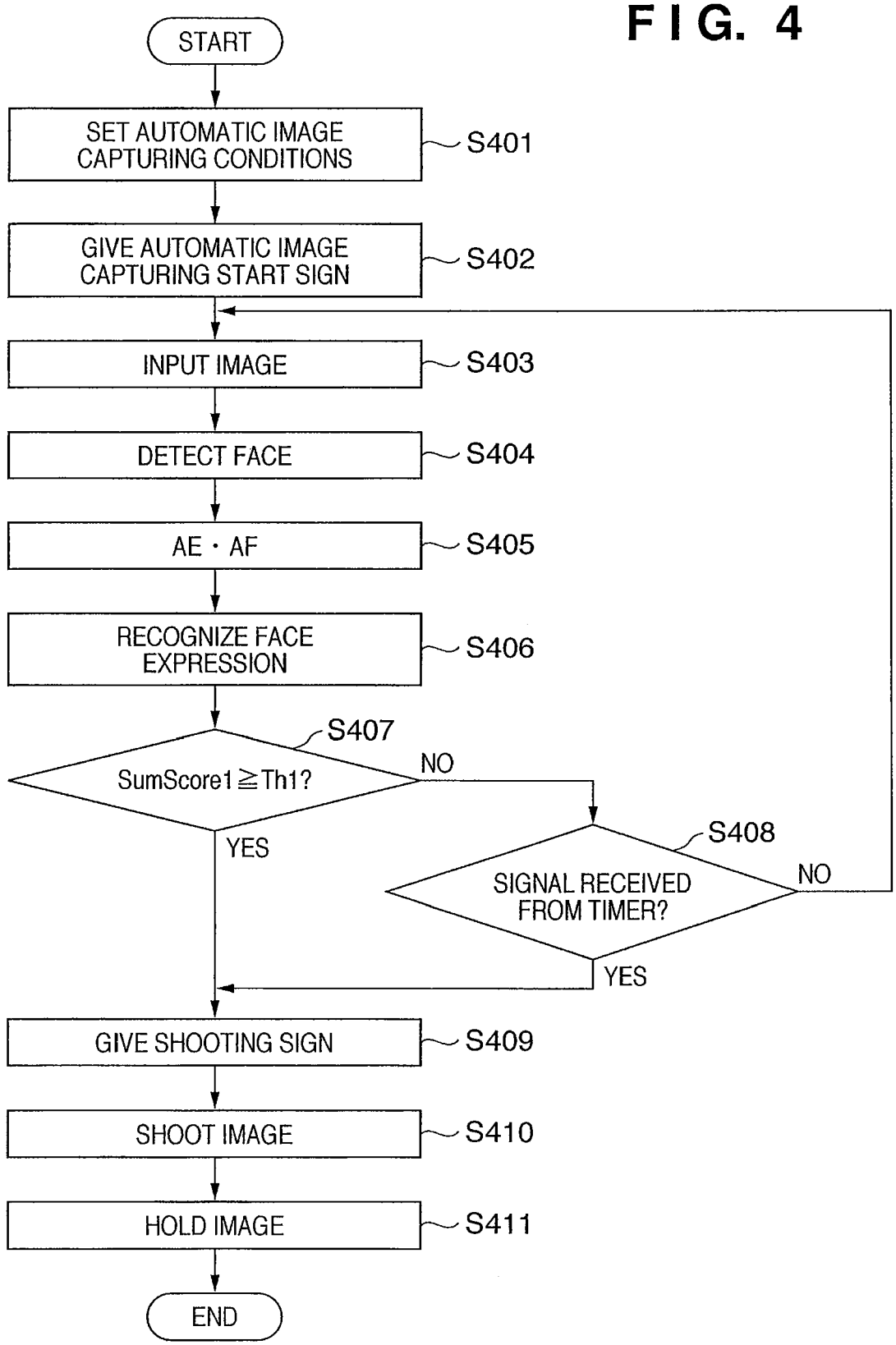
FIG. 4 is a flowchart showing the overall operation according to the first embodiment.

FIG. 4 is a flowchart showing a series of operations by the main part of the automatic image capturing apparatus.

In the first embodiment, an image is shot after giving a shooting sign when automatic image capturing conditions are satisfied. If no automatic image capturing condition is satisfied for a predetermined time after the start of the timer operation and no automatic image capturing is done, a shooting sign is given a predetermined time after the start of the timer operation. Then, an image is shot and held in the external memory 111.

Figure 5:
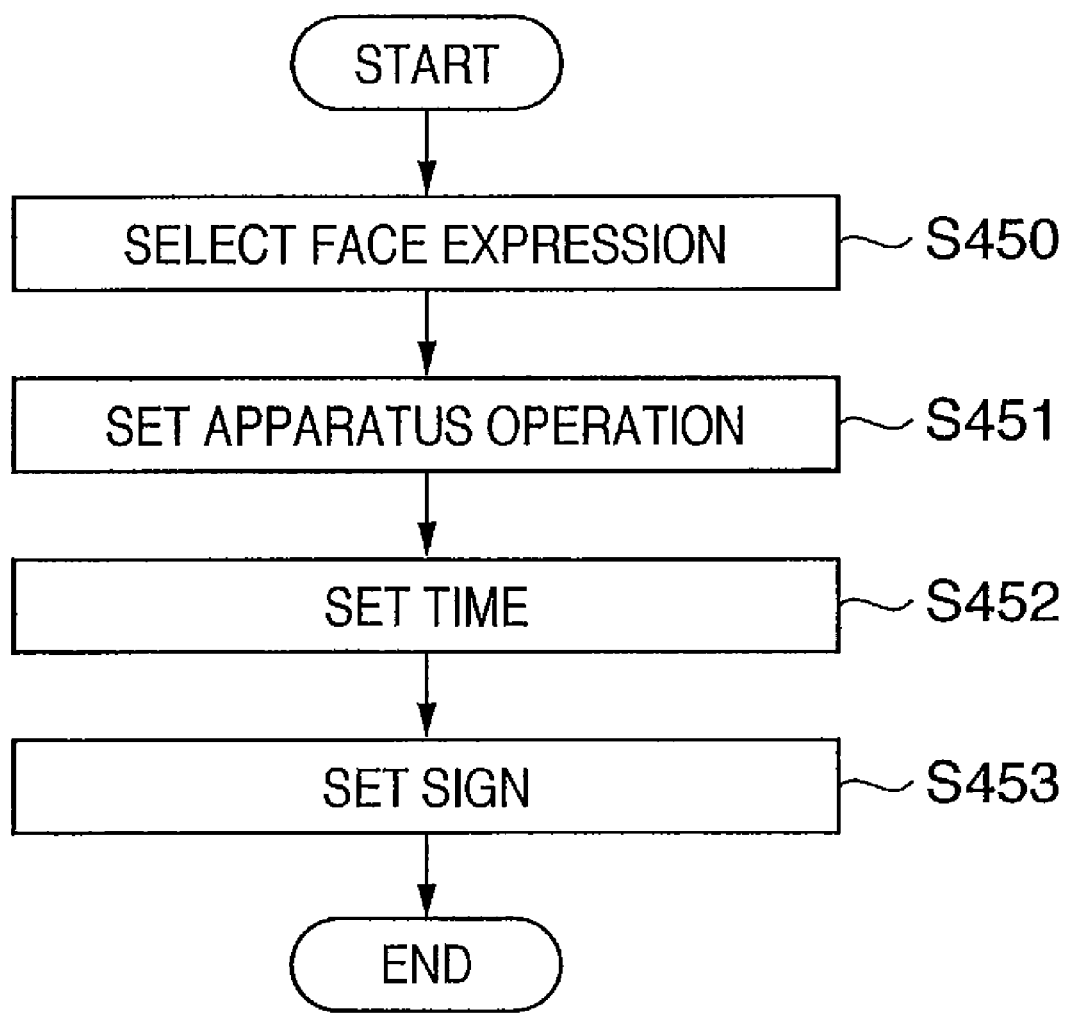
FIG. 5 is a flowchart showing a sequence of setting automatic image capturing conditions according to the first embodiment.

In step S401, a photographer or user performs setting procedures as shown in FIG. 5 by using the display unit 101 (interface 200) and the cross button 206 included in the operation unit 102 as shown in FIG. 2.

In step S450, the user selects automatic image capturing conditions at a face expression selection portion (setting items 201 to 203 in FIG. 2). For example, the user selects a smile expression at a high degree ($\geq$ the smile threshold Th1).

In step S451, the user selects, at an apparatus operation setting portion (setting item 204 in FIG. 2), an operation executed when the automatic image capturing condition such as a high degree of smile expression ($\geq$ the smile threshold Th1) is not detected and no automatic image capturing is done for the predetermined time sTime after the start of the timer operation. For example, the user selects an operation from shooting, holding of a processed image, and holding of a close image. In FIG. 2, shooting is selected.

The smile threshold Th1 or the like is set in advance using the display unit 101 (interface 200) and the cross button 206 included in the operation unit 102. The smile threshold Th1 or the like is changeable depending on photographer's preferences.

In step S452, the user sets, at a time setting portion (setting item 205 in FIG. 2), the timer setting time sTime for performing automatic image capturing or holding a close image when the automatic image capturing condition such as a high degree of smile expression ($\geq$ the smile threshold Th1) is not detected. In FIG. 2, the timer setting time sTime is set to 10 sec.

In step S453, the user selects "ON (give a sign)" at a sign setting portion (setting item 207 in FIG. 2). As a result, it is set to give a shooting sign 10 sec after the start of the timer operation, and shoot an image 10+$\Delta$t sec after the start of the timer operation. It is also possible to give a shooting sign 10−$\Delta$t sec after the start of the timer operation, and shoot an image 10 sec after the start of the timer operation.

Referring back to FIG. 4, in step S402, the user designates the start of automatic image capturing by, e.g., pressing the shutter button. At this time, the timer 108 also starts operating.

In step S403, a digital image is input to the video input unit 105 and held in the status determination memory 104.

In step S404, the status determination unit 103 detects the presence/absence and position of a face in a resolution-converted digital image held in the status determination memory 104. A processed image stored in the memory 112 and a resolution-converted digital image stored in the status determination memory 104 are generated from the same image obtained by the video input unit 105. Thus, a face position in the processed image stored in the memory 112 can be specified using the face position detected by the status determination unit 103.

Figure 6:
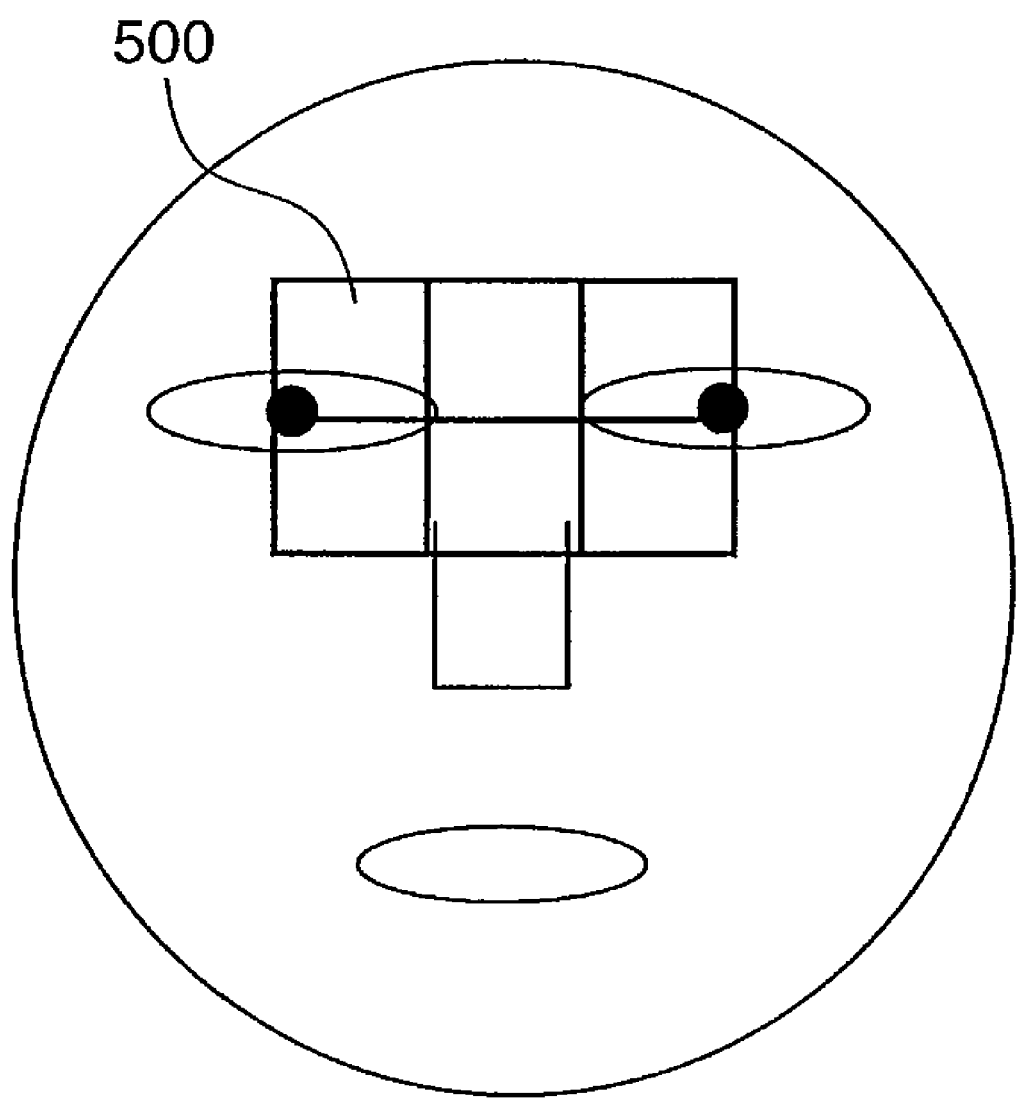
FIG. 6 is a view showing a face detection filter.

As the face detection method, many face images serving as correct images, and non-face images serving as incorrect images are prepared in advance, and learned by a convolutional neural network (see reference 1) or the like to detect the positions of an eye, mouth, and face. The present invention may also adopt face detection (see reference 2) by P. Viola and M. Jones using a rectangular segmentation filter 500 as shown in FIG. 6 and an integral image method.

(Reference 1)
Yann LeCun and Yoshua Bengio, "Convolutional Networks for Images, Speech, and Time Series", The Handbook of Brain Theory and Neural Networks, pp. 255-258, 1995
(Reference 2)
P. Viola and M. Jones, "Rapid object detection using a Boosted Cascade of Simple Features", Proc. of IEEE Conf. CVPR, 1, pp. 511-518, 2001

In step S405, an exposure value for the AF (Automatic Focus) operation and AE (Automatic Exposure) operation is calculated. At this time, the focus may be adjusted to the person's face position detected in step S404, or the detected person's face may be exposed using the processed image stored in the memory 112.

Figure 8:
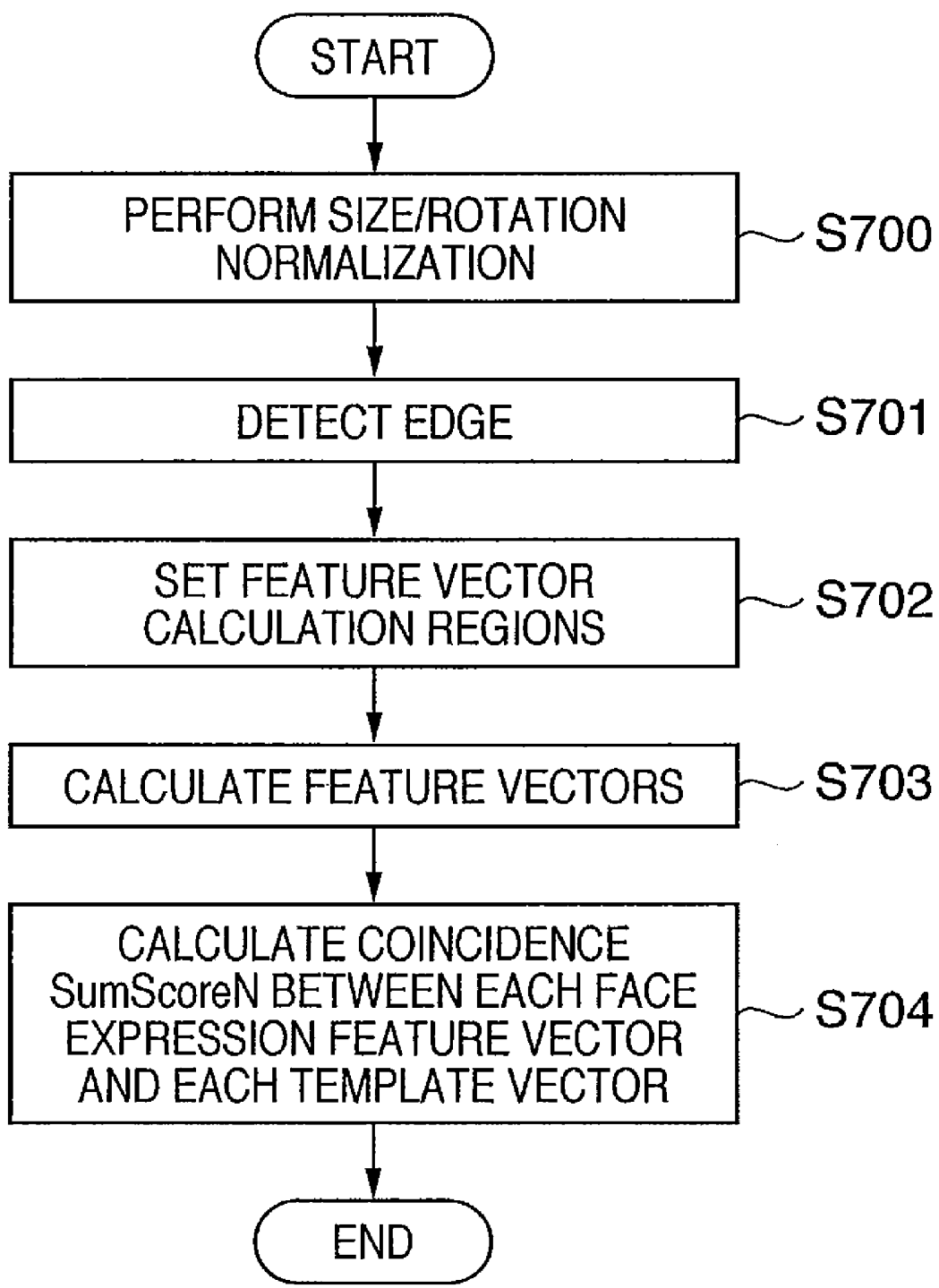
FIG. 8 is a flowchart showing a processing sequence performed in face expression determination processing.

In step S406, the status determination unit 103 recognizes the expression of the face detected in step S404. The face expression recognition processing by the status determination unit 103 is performed according to a sequence as shown in FIG. 8.

Figure 7:
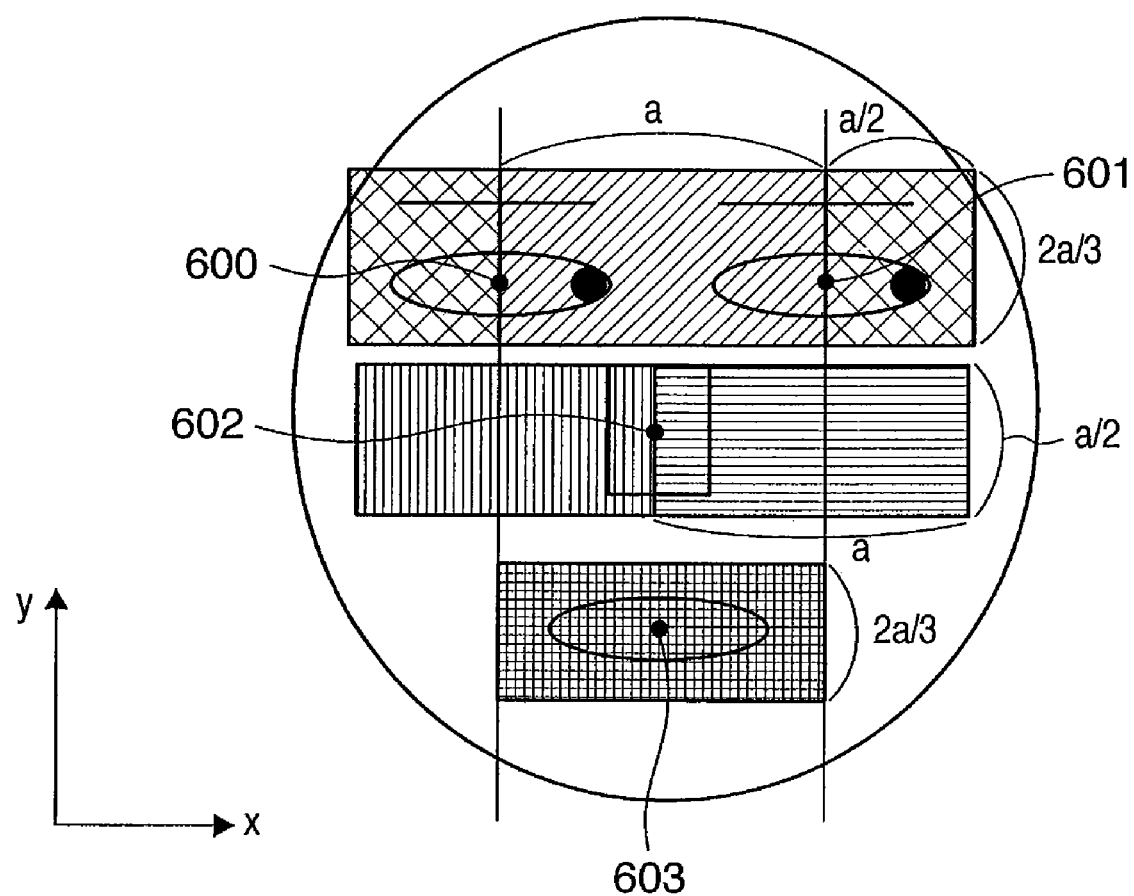
FIG. 7 is a view showing region segmentation performed in face expression recognition processing.

In size/rotation normalization step S700, the vector is calculated from left and right eye positions 600 and 601 in FIG. 7 detected in step S404 of FIG. 4. The image is rotated using affine transformation so that the calculated vector becomes parallel to the x-axis in FIG. 7. The face size is normalized to set the distance between the left and right eye positions 600 and 601 to a predetermined value.

In edge detection step S701, the edge is detected using an edge detection filter such as a Sobel filter.

In feature vector calculation region setting step S702, regions used to recognize a face expression are set using the eye positions 600 and 601, a mouth position 603, and a face position 602 which have been detected in face detection processing step S404, as shown in FIG. 7.

In feature vector calculation step S703, feature vectors (I=1, 2, 3, . . . ) are calculated for the respective regions.

In feature vector/face expression template vector coincidence calculation step S704, the coincidence between each of the feature vectors of each face expression prepared in advance and each of feature vectors calculated from the input image is calculated. The score of each feature vector is calculated. The result of adding calculated scores is defined as the sum score SumScoreN (N=1, 2, 3, . . . ) of each face expression as represented by equation (1). A face expression having the highest sum score SumScoreN (N=1, 2, 3, . . . ) is determined as the target face expression.

$$SumScoreN = \sum_{i=1}^{N} Score_i \quad (1)$$

i: the number of feature vectors
N: the number of face expressions
$Score_i$: a score calculated from the ith feature vector
SumScore: the sum of scores calculated from feature vectors As the face expression recognition method, only expressive portions may be extracted from a face and undergo wavelet transformation. In this case, the average power of the spatial frequency is calculated for each predetermined band. The difference between the calculated average power and an average power stored in advance for an expressionless face is calculated, recognizing the face expression (see reference 3). The embodiment calculates the coincidence between each of smile feature vectors prepared in advance and each of feature vectors calculated from an input image.

(Reference 3)
Japanese Patent Laid-Open No. 8-249447

Referring back to FIG. 4, if the calculated sum score Sum-Score1 (smile degree) represents a smile expression at a degree equal to or higher than the preset threshold Th1 in step S407, the sign generation unit 106 gives a shooting sign to an object in step S409. The sign generation unit 106 generates light or sound as the shooting sign.

An image is shot in step S410, and the image shot immediately after giving the shooting sign is held in the external memory 111 in step S411.

If the sum score SumScore1 (smile degree) represents a smile expression at a degree smaller than the preset threshold Th1 or another face expression in step S407, the process advances to step S408. In step S408, it is determined whether a signal has been received from the timer 108.

If a signal has been received from the timer 108, the sign generation unit 106 gives a shooting sign to the object in step S409. An image is shot in step S410, and the shot image is held in the external memory 111 in step S411.

If no signal has been received from the timer 108 in step S408, the process returns to step S403 to process the next image sequentially output from the video input unit 105.

As described above, according to the first embodiment, if no automatic image capturing condition is satisfied for a predetermined time after the start of the automatic image capturing operation, an image is automatically shot (timer operation) a predetermined time after the start of automatic image capturing. The first embodiment can, therefore, avoid a situation in which no image is shot during automatic image capturing operation.

Second Embodiment

Figure 9:
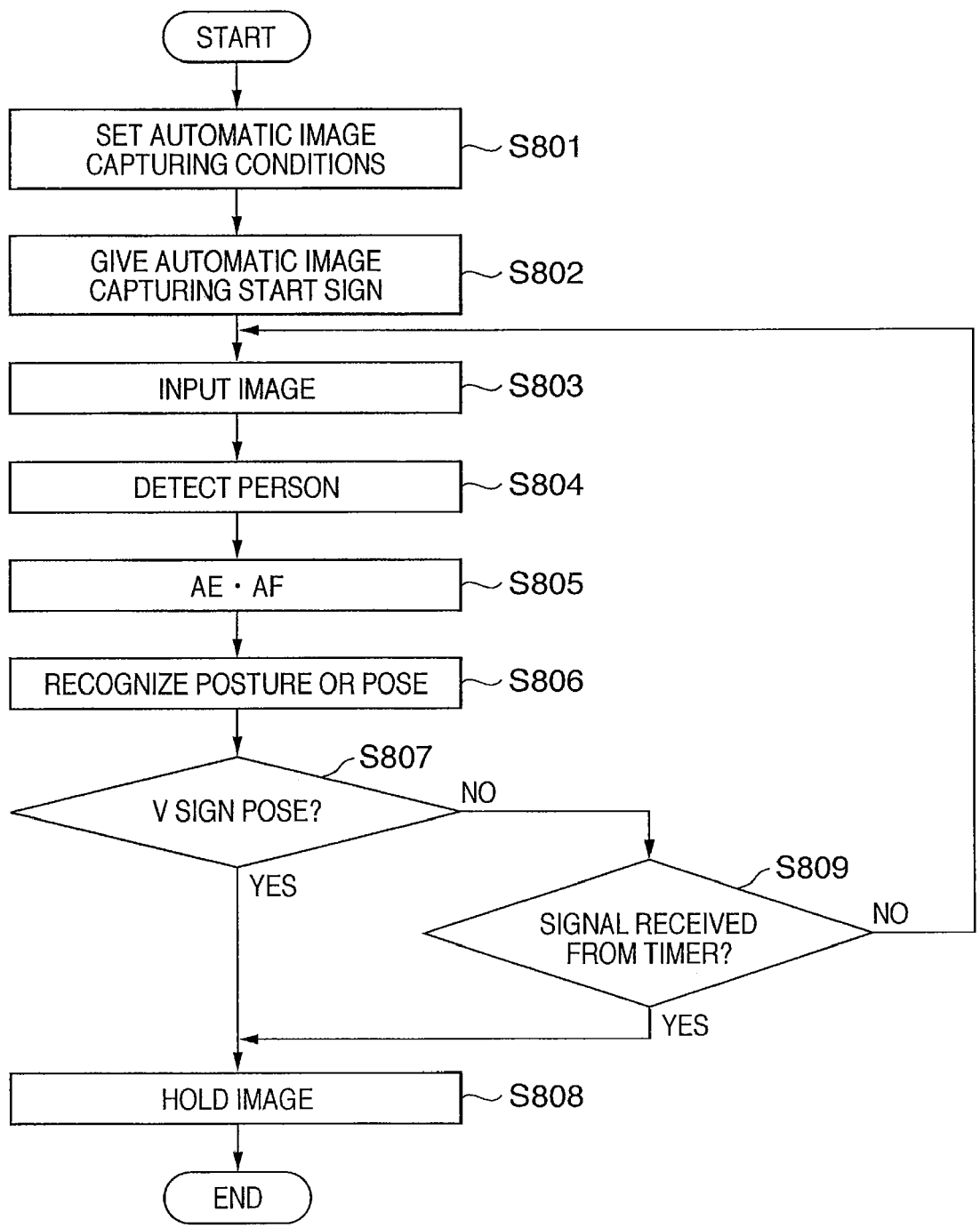
FIG. 9 is a flowchart showing the overall operation according to the second embodiment.

FIG. 9 is a flowchart showing a series of operations by the main part of an automatic image capturing apparatus according to the second embodiment of the present invention. The automatic image capturing apparatus has the same arrangement as that in the first embodiment.

In the second embodiment, an external memory 111 holds a processed image when automatic image capturing conditions are satisfied. If no automatic image capturing condition is satisfied for a predetermined time after the start of the timer operation and no automatic image capturing is done, the external memory 111 holds a processed image obtained a predetermined time after the start of the timer operation.

Figure 10:
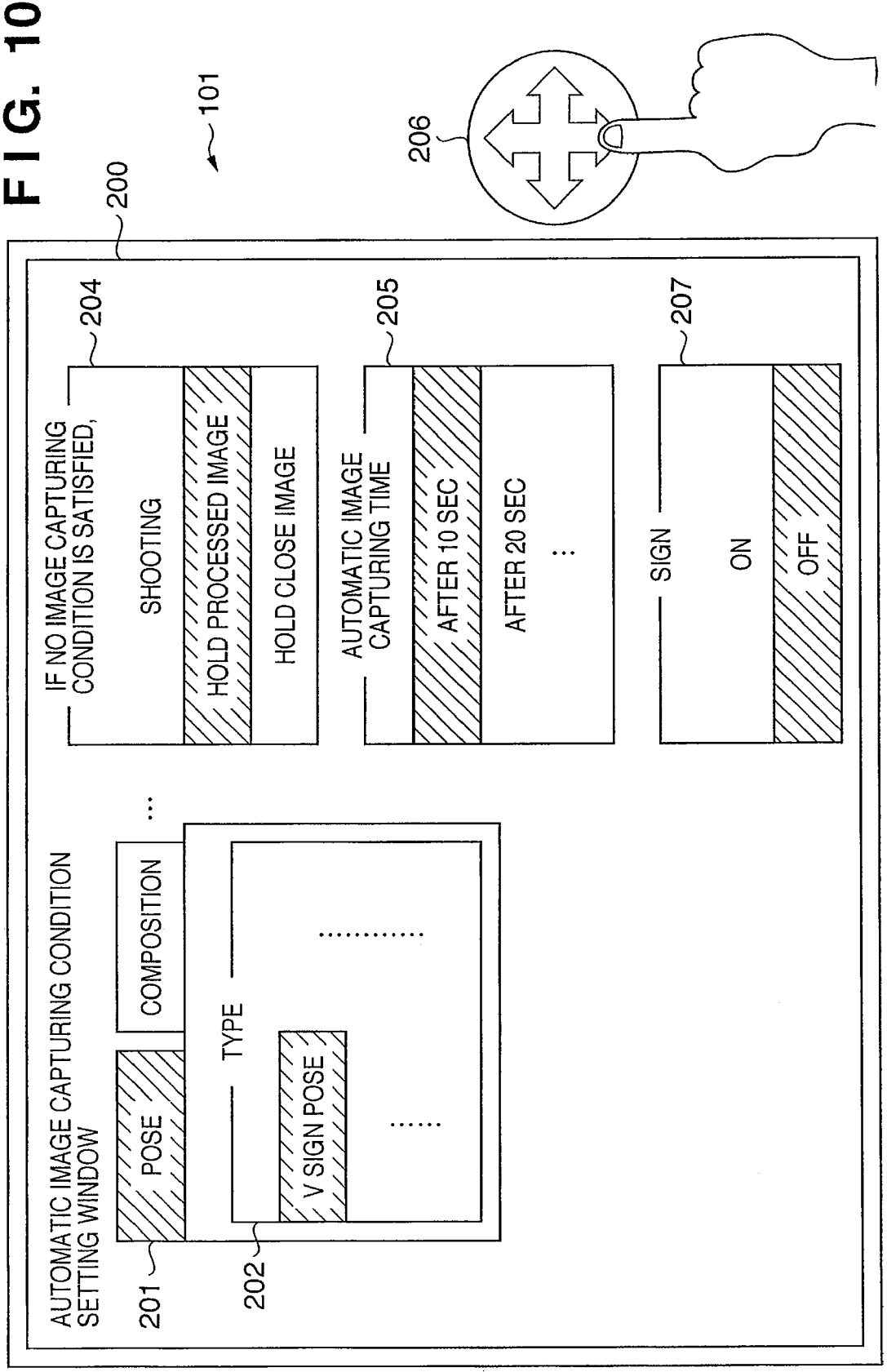
FIG. 10 is a view showing a setting interface and cross button according to the second embodiment.
Figure 11:
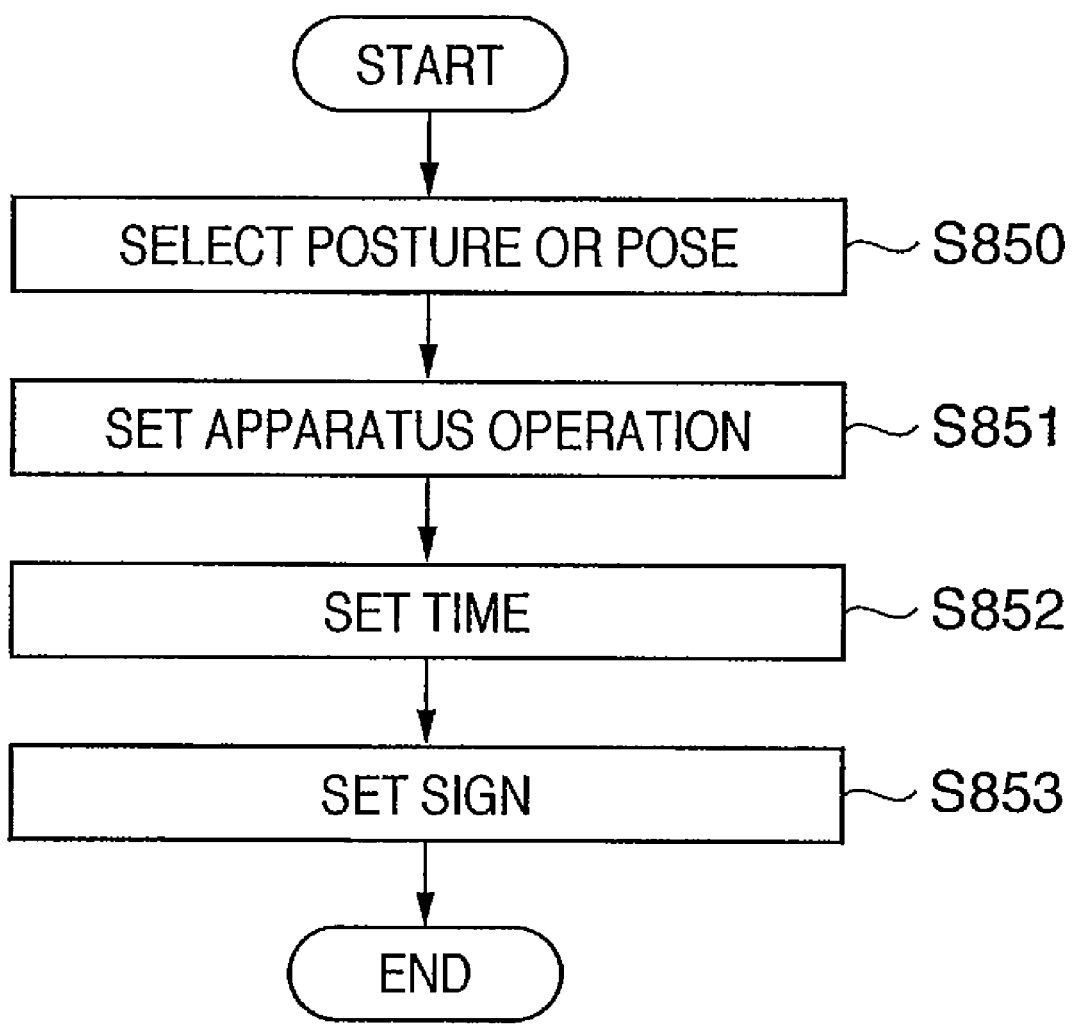
FIG. 11 is a flowchart showing a sequence of setting automatic image capturing conditions according to the second embodiment.

In step S801, a photographer or user performs setting procedures as shown in FIG. 11 by using a display unit 101 (interface 200) and a cross button 206 included in an operation unit 102 as shown in FIG. 10.

Figure 12:
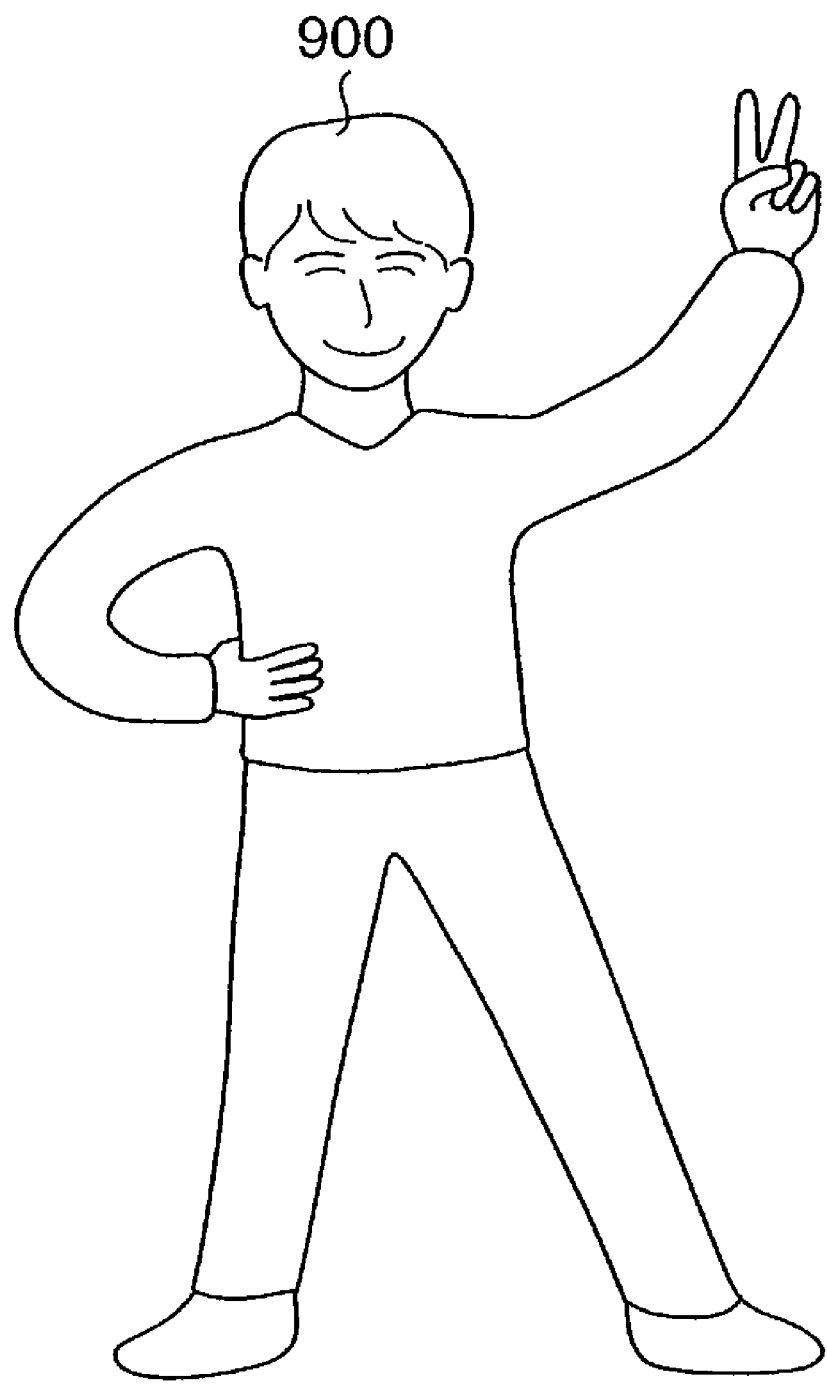
FIG. 12 is a view showing a person who makes the V sign pose.

In step S850, the user selects, at a posture/pose selection portion (setting items 201 and 202 in FIG. 10), a case where an object makes a V sign pose 900 as shown in FIG. 12.

In step S851, the user selects, at an apparatus operation setting portion (setting item 204 in FIG. 10), an operation to hold a processed image a predetermined time after the start of the timer operation when, for example, no V sign pose is detected and no automatic image capturing is done for a predetermined time after the start of the timer operation.

In step S852, the user sets, at a time setting portion (setting item 205 in FIG. 10), an automatic image capturing time for holding a processed image a predetermined time after the start of the timer operation when, for example, no V sign pose of a person is detected and no automatic image capturing is done for a predetermined time after the start of the timer operation. In FIG. 10, the time is set to 10 sec.

In step S853, the user selects, e.g., "OFF (give no sign)" at a sign setting portion (setting item 207 in FIG. 10).

Referring back to FIG. 9, the same processes as those in the first embodiment are performed in steps S802 and S803.

In step S804, a person in a digital image obtained in step S803 is detected. A person is detected from the background difference between an updated background image and an input image, as disclosed in, e.g., Japanese Patent Laid-Open No. 7-302328.

In step S805, an exposure value for the AF (Automatic Focus) operation and AE (Automatic Exposure) operation is calculated. At this time, the focus may be adjusted to the person's face position detected in step S804, or the detected person's face may be exposed.

In step S806, it is determined whether the person detected in step S804 makes the V sign pose 900 as shown in FIG. 12. A posture or pose is recognized by extracting the edge of a specific portion of an object, and comparing it with a stored pattern, as disclosed in Japanese Patent Laid-Open No. 7-57103.

Note that an action is recognized by a method as disclosed in Japanese Patent Laid-Open No. 5-46583. More specifically, a feature amount vector such as the directional distribution of the optical flow is extracted from an image, and the time series model of the behavior is trained from learning data as a probabilistic state transition model corresponding to each recognition category. The behavior is recognized by calculating the probability of a behavior to be recognized from training models.

If it is determined in step S807 that the person detected in step S804 does not make the V sign pose, it is determined in step S809 whether a signal has been received from a timer 108. If a signal has been received, the external memory 111 holds, in step S808, a processed image acquired immediately after receiving the signal. If it is determined in step S809 that no signal has been received from the timer 108, the process returns to step S803 to process the next image sequentially output from a video input unit 105.

If it is determined in step S807 that the person detected in step S804 makes the V sign pose, the external memory 111 holds a processed image containing the determined V sign pose in step S808.

Third Embodiment

Figure 13:
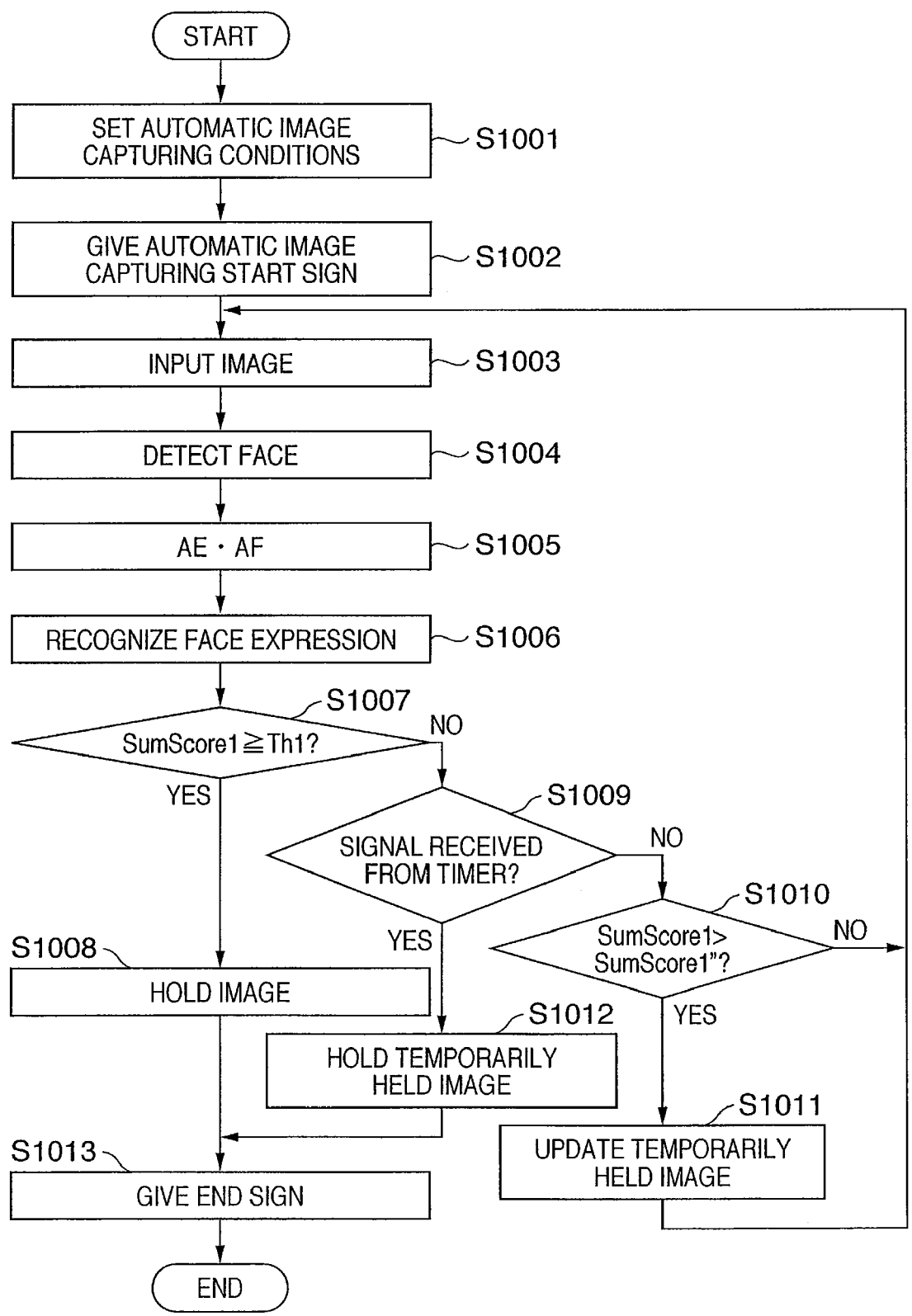
FIG. 13 is a flowchart showing the overall operation according to the third embodiment.

FIG. 13 is a flowchart showing a series of operations by the main part of an automatic image capturing apparatus according to the third embodiment of the present invention. The automatic image capturing apparatus has the same arrangement as that in the first embodiment.

In the third embodiment, an external memory 111 holds a processed image when automatic image capturing conditions are satisfied. If no automatic image capturing condition is satisfied for a predetermined time after the start of the timer operation and no automatic image capturing is done, the external memory 111 holds a close image which marginally satisfies automatic image capturing conditions among images obtained till the lapse of the time.

Figure 14:
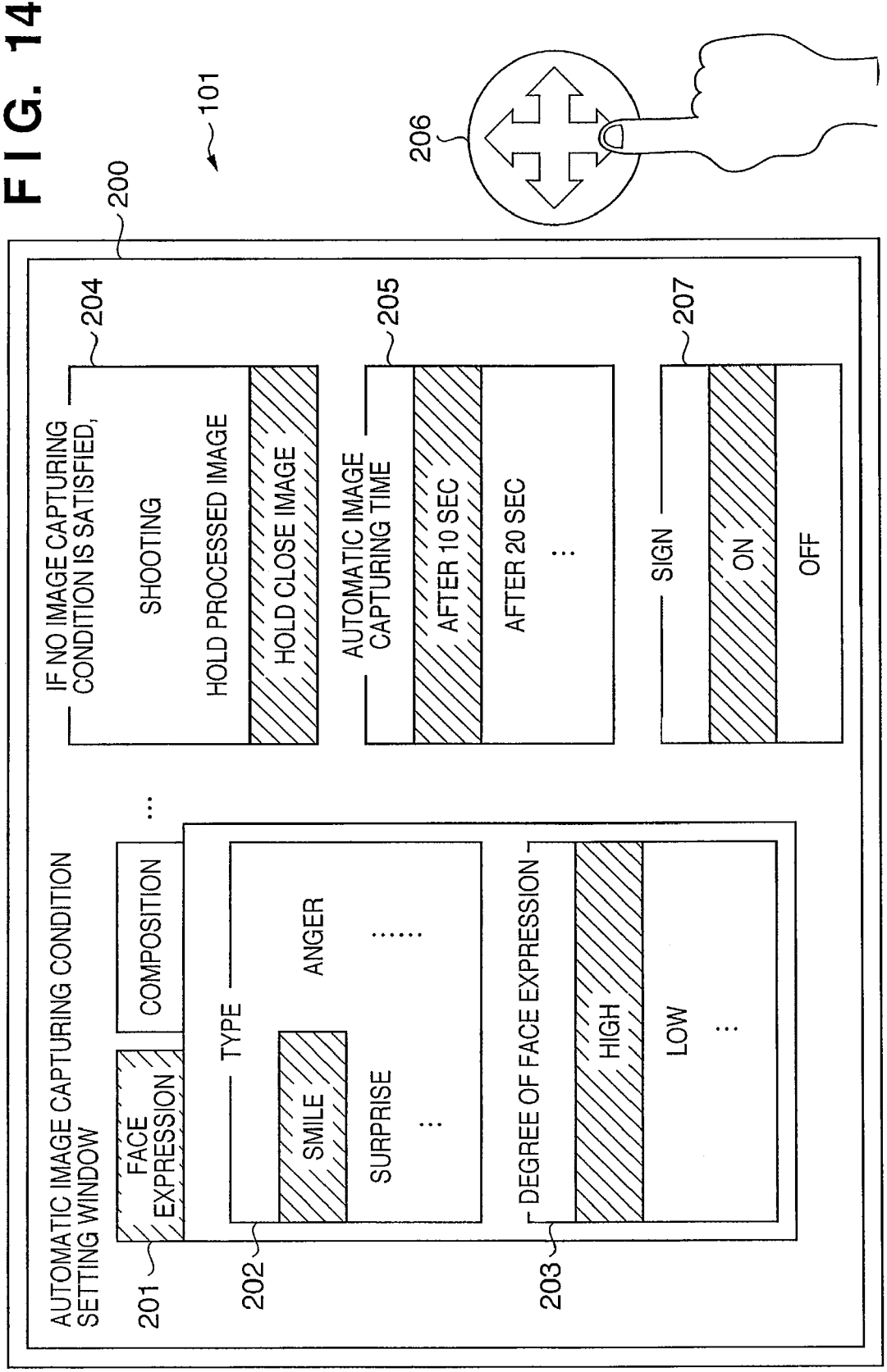
FIG. 14 is a view showing a setting interface and cross button according to the third embodiment.

In step S1001, a photographer or user performs setting procedures as shown in FIG. 5 by using a display unit 101 (interface 200) and a cross button 206 included in an operation unit 102 as shown in FIG. 14.

In step S450, the user selects automatic image capturing conditions at a face expression selection portion (setting items 201 to 203 in FIG. 14). For example, the user selects a smile expression at high degree ($\geqq$the smile threshold Th1).

In step S451, the user selects, at an apparatus operation setting portion (setting item 204 in FIG. 14), the following operation executed when the automatic image capturing condition such as a high degree of smile expression ($\geqq$the smile threshold Th1) is not detected and no automatic image capturing is done for the predetermined time sTime after the start of the timer operation. That is, the user selects an operation to hold, a predetermined time after the start of the timer operation, an image (close image) closest to a high degree of smile expression among images obtained till the lapse of the predetermined time.

The smile threshold Th1 or the like is set in advance using the display unit 101 and operation unit 102. The smile threshold Th1 or the like is changeable depending on photographer's preferences.

In step S452, the user sets, at a time setting portion (setting item 205 in FIG. 14), the timer setting time sTime for holding the close image when the automatic image capturing condition such as a high degree of smile expression ($\geqq$the smile threshold Th1) is not detected. In FIG. 14, the user selects 10 sec.

In step S453, the user selects "ON (give a sign)" at a sign setting portion (setting item 207 in FIG. 14). As a result, it is set to hold a close image 10 sec after the start of the timer operation and give an end sign 10+$\Delta$t sec after the start of the timer operation.

Referring back to FIG. 13, the same processes as those in the first embodiment are performed in steps S1002 and S1003.

In step S1004, the presence/absence and position of a face in a digital image obtained in step S1003 are detected as described in the first embodiment. A processed image stored in a memory 112 and a resolution-converted digital image stored in a status determination memory 104 are generated from the same image obtained by a video input unit 105. Thus, a face position in the processed image stored in the memory 112 can be specified using the face position detected by a status determination unit 103.

In step S1005, an exposure value for the AF (Automatic Focus) operation and AE (Automatic Exposure) operation is calculated. At this time, the focus may be adjusted to the person's face position detected in step S1004, or the detected person's face may be exposed using the processed image stored in the memory 112.

In step S1006, the face expression of the person detected in step S1004 is recognized as described in the first embodiment.

If no automatic image capturing condition is satisfied, i.e., the face expression is not a high degree of smile expression (SumScore1<Th1) in step S1007, it is determined in step S1009 whether a signal has been received from a timer 108.

Figure 15:
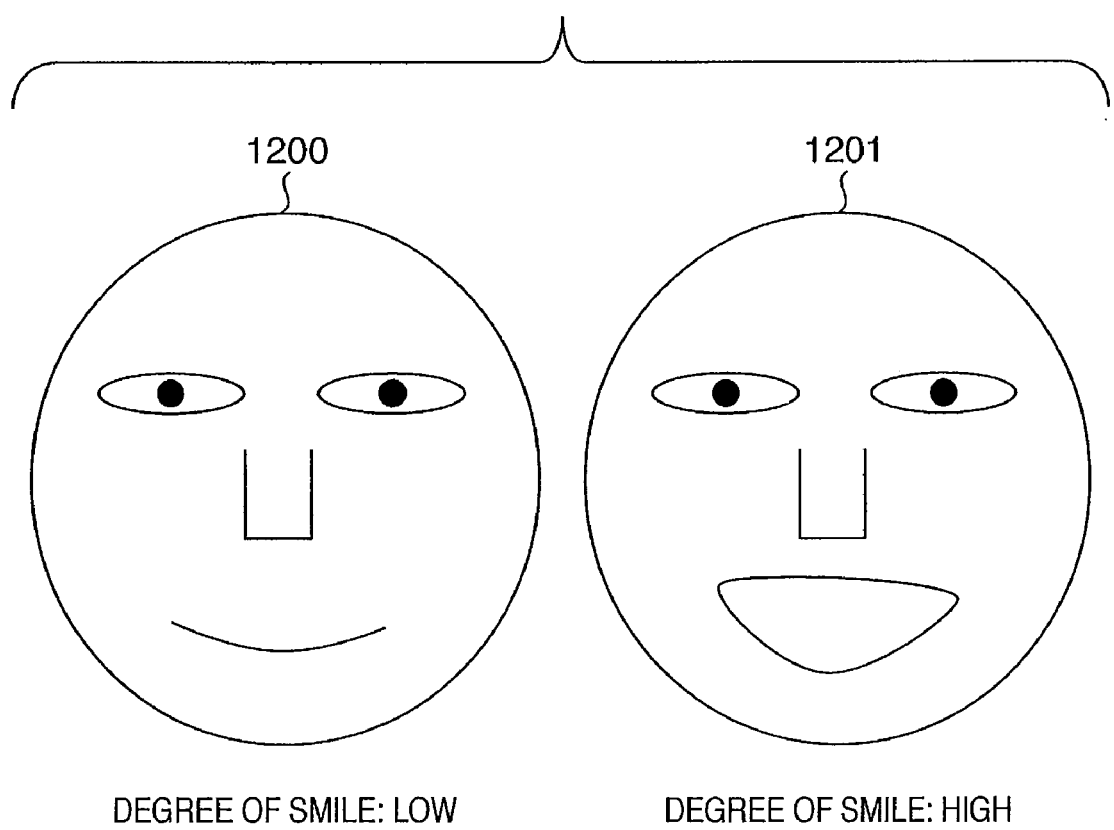
FIG. 15 is a view showing a face at low smile degree and a face at high smile degree.

If no signal has been received in step S1009, the process advances to step S1010. If the score SumScore1 of smile expression of a resolution-converted digital image corresponding to the processed image of the current frame is higher than a score SumScore1" of a resolution-converted digital image corresponding to a processed image held in the memory 112 or the like, the close image is updated to the processed image of the current frame in step 1011. In other words, if the degree of smile in an input image 1201 is higher than that in an image 1200 held in the memory 112 or the like, as shown in FIG. 15, the close image held in the memory 112 or the like is updated to the image 1201. If the memory 112 does not hold any smile image, it directly holds an acquired image as the close image. The memory 112 holds a pair of the score SumScore1 representing the degree of smile, and the close image having this score.

In step S1010, if the score SumScore1 of the newly acquired image is equal to or lower than the score SumScore1" of the close image held in the memory 112, the process returns to step S1003 to process the next image.

If a signal has been received from the timer 108 in step S1009, the external memory 111 holds the image temporarily held in the memory 112 in step S1012, and the process advances to step S1013.

If it is determined in step S1007 that the face expression is a high degree of smile (SumScore1$\geqq$Th1), the external memory 111 holds a processed image corresponding to the determined resolution-converted digital image, and the process advances to step S1013.

In step S1013, a sign generation unit 106 gives an end sign by, e.g., firing a flash. In the third embodiment, a processed image held in the external memory in step S1008 or S1012 is a still image obtained by executing automatic image capturing.

Fourth Embodiment

Figure 16:
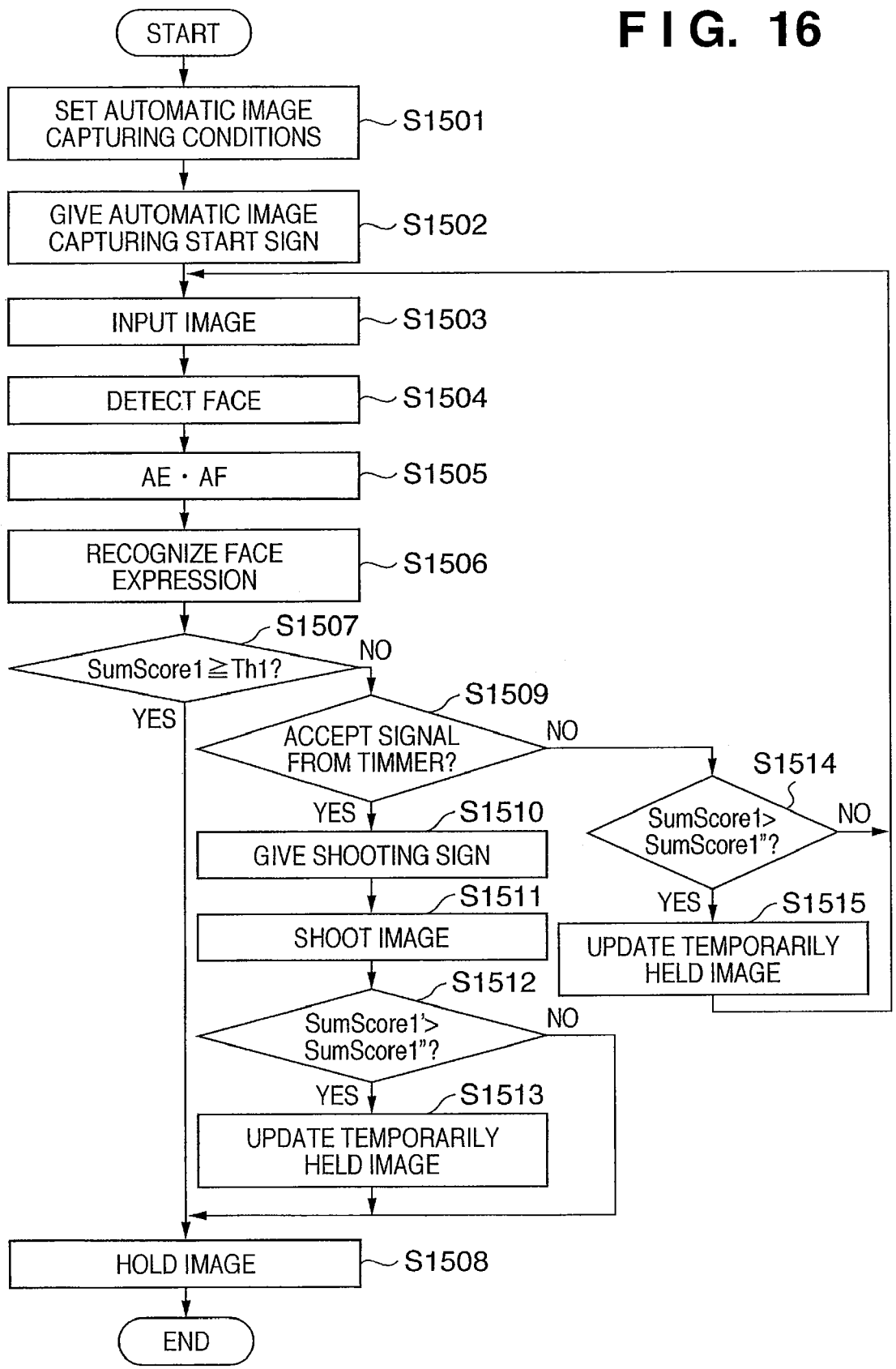
FIG. 16 is a flowchart showing the overall operation according to the fourth embodiment.

FIG. 16 is a flowchart showing a series of operations by the main part of an automatic image capturing apparatus according to the fourth embodiment of the present invention. The automatic image capturing apparatus has the same arrangement as that in the first embodiment.

In the fourth embodiment, an external memory 111 holds a processed image when automatic image capturing conditions are satisfied. If no automatic image capturing condition is satisfied for a predetermined time t' after the start of the timer operation and no automatic image capturing is done, a sign generation unit 106 gives a shooting sign by, e.g., generating sound a time t'+$\Delta$t1' after the start of the timer operation. An image shot upon the lapse of a time t'+$\Delta$t1'+$\Delta$t2' is compared with a close image which marginally satisfies automatic image capturing conditions, among images which are obtained till the lapse of the predetermined time t' and held in a memory 112. The external memory 111 holds the close image which marginally satisfies the automatic image capturing conditions. In the fourth embodiment, a status determination unit 103 determines an object status in even a shot image.

Figure 17:
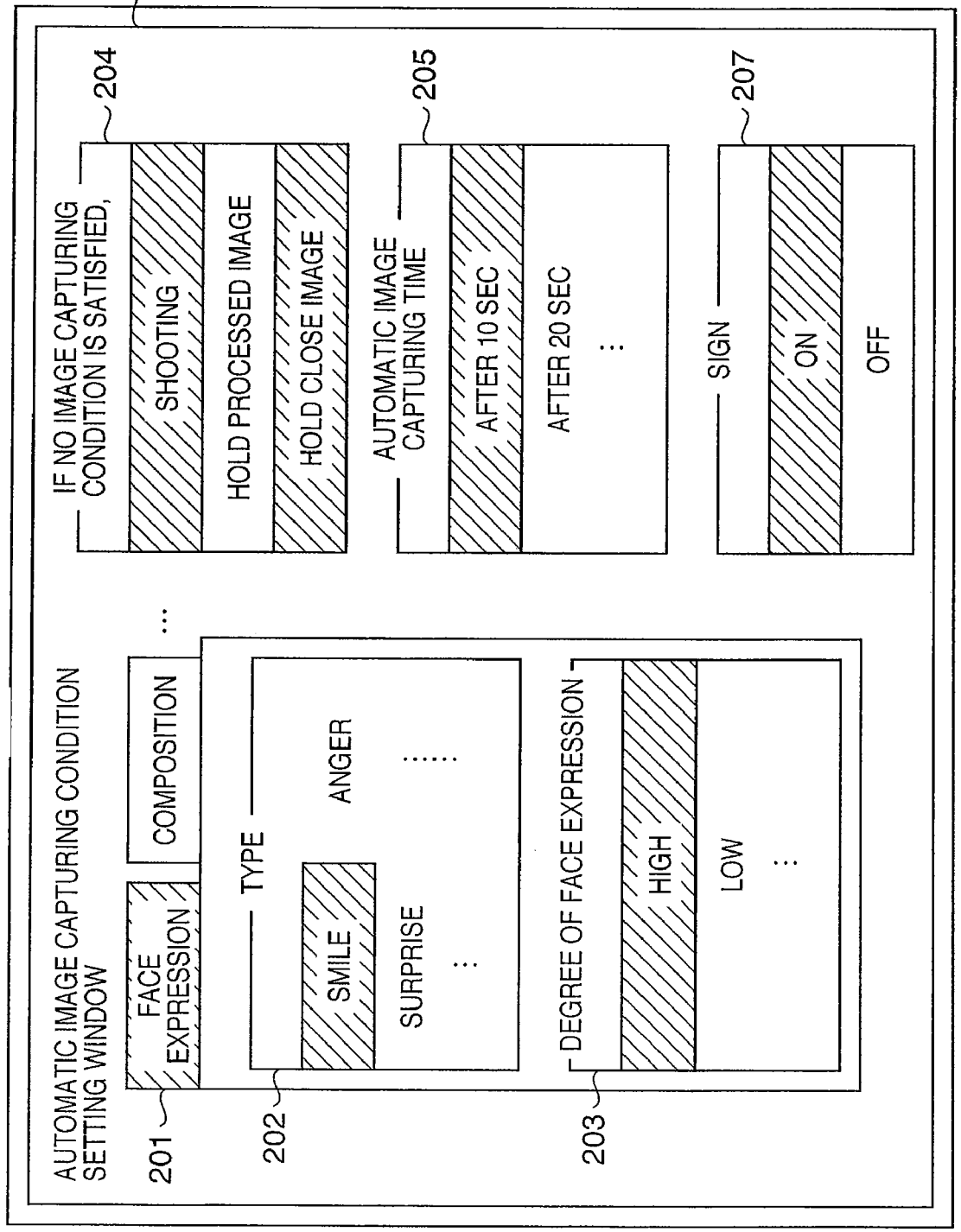
FIG. 17 is a view showing a setting interface and cross button according to the fourth embodiment.

In step S1501, a photographer or user performs setting procedures as shown in FIG. 5 by using a display unit 101 (interface 200) and a cross button 206 included in an operation unit 102 as shown in FIG. 17.

In step S450, the user selects automatic image capturing conditions at a face expression selection portion (setting items 201 to 203 in FIG. 17). For example, the user selects a smile expression at high degree ($\geq$the smile threshold Th1).

In step S451, the user selects, at an apparatus operation setting portion (setting item 204 in FIG. 17), the following operation executed when the automatic image capturing condition such as a high degree of smile expression ($\geq$the smile threshold Th1) is not detected and no automatic image capturing is done for a predetermined time after the start of the timer operation. That is, the user selects an operation to hold, a predetermined time after the start of the timer operation, an image (close image) closest to a high degree of smile expression among images obtained till the lapse of the predetermined time. At the same time, the user also selects an operation to perform the automatic image capturing operation a predetermined time after the start of the timer operation.

In step S452, the user sets, at a time setting portion (setting item 205 in FIG. 17), the timer setting time t' for holding the close image when the automatic image capturing condition such as a high degree of smile expression ($\geq$the smile threshold Th1) is not detected. In FIG. 17, the timer setting time t' is set to 10 sec.

In step S453, the user selects "ON (give a sign)" at a sign setting portion (setting item 207 in FIG. 17). As a result, it is set to hold a close image t' sec after the start of the timer operation and give a shooting sign t'+$\Delta$t1' sec after the start of the timer operation.

From this, the following processing is executed when no high degree of smile expression is recognized for the time t' and no automatic image capturing is done. More specifically, an image shot upon the lapse of a predetermined time t'+$\Delta$t1'+$\Delta$t2' is compared with a close image which marginally satisfies automatic image capturing conditions, among processed images which are obtained till the lapse of the time t' and temporarily held in the memory 112. The external memory 111 holds the close image which marginally satisfies the automatic image capturing conditions.

Note that $\Delta$t1' and $\Delta$t2' are changeable depending on photographer's preferences.

Referring back to FIG. 16, the same processes as those in the first embodiment are performed in steps S1502 and S1503.

In step S1504, the presence/absence and position of a face in a digital image obtained in step S1503 are detected as described in the first embodiment. A processed image stored in the memory 112 and a resolution-converted digital image stored in a status determination memory 104 are generated from the same image obtained by a video input unit 105. Thus, a face position in the processed image stored in the memory 112 can be specified using the face position detected by the status determination unit 103.

In step S1505, an exposure value for the AF (Automatic Focus) operation and AE (Automatic Exposure) operation is calculated. At this time, the focus may be adjusted to the person's face position detected in step S1504, or the detected person's face may be exposed using the processed image stored in the memory 112.

In step S1506, the face expression of the person detected in step S1504 is recognized as described in the first embodiment.

If no automatic image capturing condition is satisfied, i.e., SumScore1<Th1 (the face expression is not a high degree of smile expression) in step S1507, it is determined in step S1509 whether a signal has been received from a timer 108.

If no signal has been received, the process advances to step S1514. If the score SumScore1 of smile expression of a resolution-converted digital image corresponding to the current processed image is higher than the score SumScore1" of a resolution-converted digital image corresponding to a processed image held in the memory 112, the close image is updated to the processed image of the current frame in step 1515. If the memory 112 does not hold any smile image, it directly holds the current processed image as the close image.

In step S1514, if the score SumScore1 of smile expression of the current processed image is equal to or lower than the score SumScore1" of the close image held in the memory 112, the process returns to step S1503 to process the next image without updating the close image.

If a signal has been received from the timer 108 in step S1509, the sign generation unit 106 gives a shooting sign by, e.g., turning on the light in step S1510. In step S1511, an image is shot. A shooting sign can prompt an object to smile.

In step S1512, it is determined whether a score SumScore1' of smile expression of a resolution-converted digital image corresponding to the image shot in step S1511 is higher than the score SumScore1" of smile expression of a resolution-converted digital image corresponding to the close image held in the memory 112. If the score of the resolution-converted digital image corresponding to the shot image is higher than that of the resolution-converted digital image corresponding to the close image held in the memory 112, the close image held in the memory 112 is updated to the shot image in step 1513. In step S1508, the external memory 111 such as a flash memory holds the close image as a still image obtained by executing automatic image capturing.

If it is determined in step S1507 that the face expression is a high degree of smile image, the external memory 111 holds, in step S1508, the determined processed image as a still image obtained by executing automatic image capturing.

Fifth Embodiment

Figure 18:
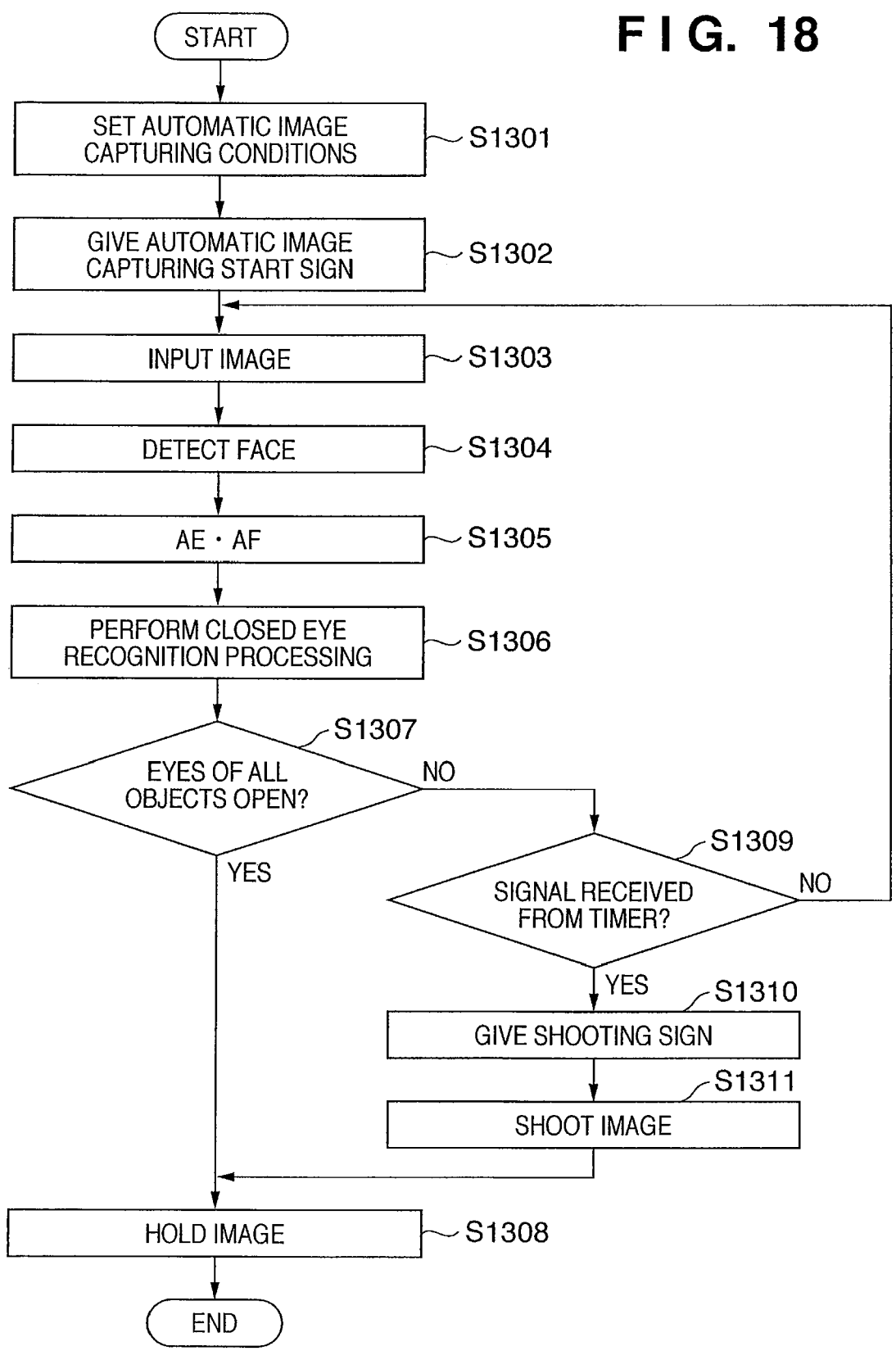
FIG. 18 is a flowchart showing the overall operation according to the fifth embodiment.

FIG. 18 is a flowchart showing a series of operations by the main part of an automatic image capturing apparatus according to the fifth embodiment of the present invention. The automatic image capturing apparatus has the same arrangement as that in the first embodiment.

In the fifth embodiment, an external memory 111 holds a processed image when automatic image capturing conditions are satisfied. If no automatic image capturing condition is satisfied for a predetermined time after the start of the timer operation and no automatic image capturing is done, a sign generation unit 106 gives a shooting sign by, e.g., generating sound a predetermined time after the start of the timer operation. Then, an image is shot and held in the external memory 111.

Figure 19:
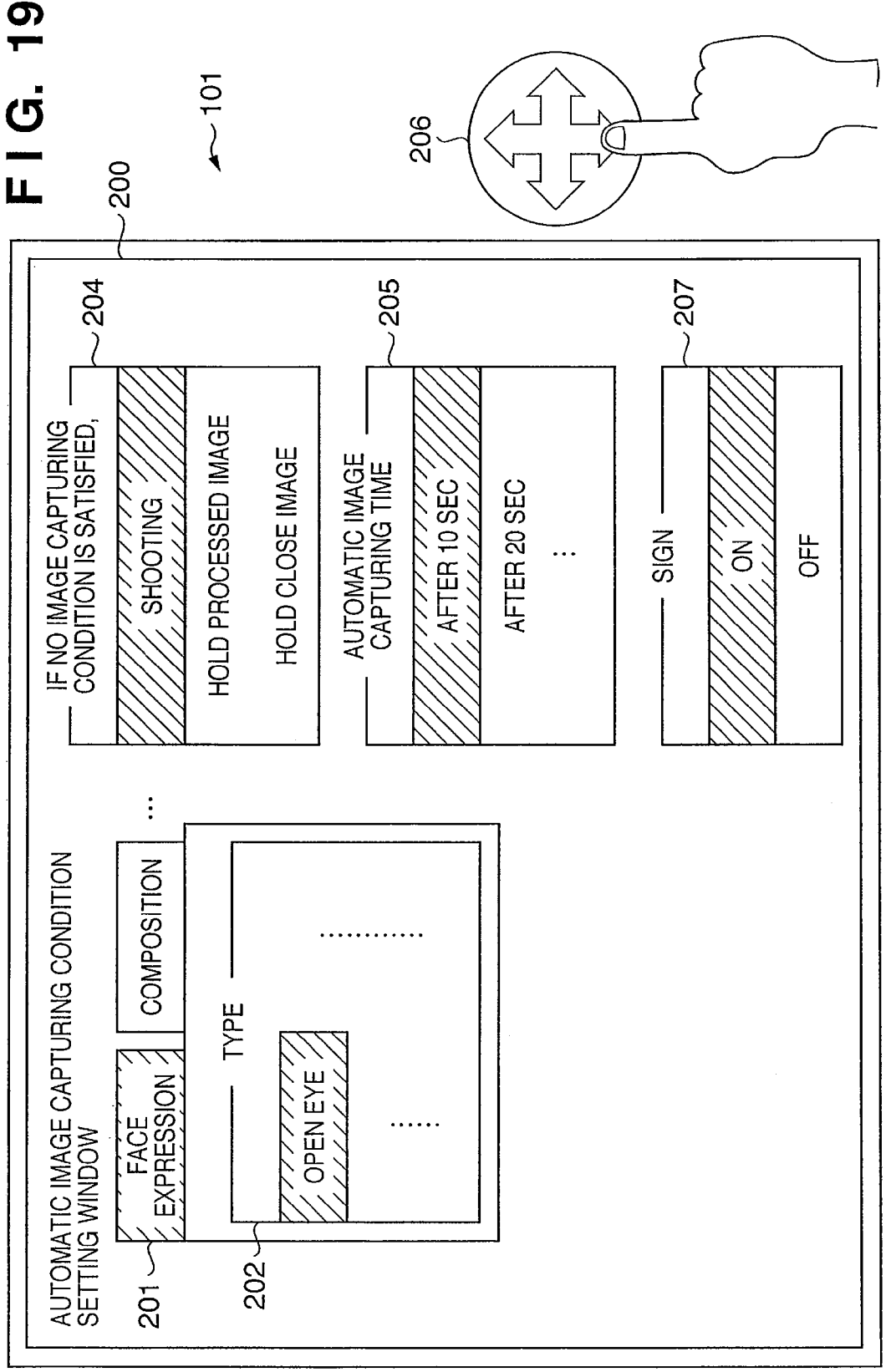
FIG. 19 is a view showing a setting interface and cross button according to the fifth embodiment.

In step S1301, a photographer or user performs setting procedures as shown in FIG. 5 by using a display unit 101 (interface 200) and a cross button 206 included in an operation unit 102 as shown in FIG. 19.

In step S450, the user selects automatic image capturing conditions at a face expression selection portion (setting items 201 and 202 in FIG. 19). For example, the user selects a case where the eyes of all objects are open.

In step S451, the user selects, at an apparatus operation setting portion (setting item 204 in FIG. 19), an operation to shoot an image a predetermined time after the start of the timer operation when it is not detected that the eyes of all objects are open, and no automatic image capturing is done for the predetermined time sTime after the start of the timer operation.

In step S452, the user sets, at a time setting portion (setting item 205 in FIG. 19), the automatic image capturing time to t' sec when it is not detected that the eyes of all objects are open. In FIG. 19, the automatic image capturing time is set to 10 sec.

In step S453, the user selects "ON (give a sign)" at a sign setting portion (setting item 207 in FIG. 19). As a result, it is set to give a shooting sign t' sec after the start of the timer operation and shoot an image t'+Δt1' sec after the start of the timer operation.

Referring back to FIG. 18, the same processes as those in the first embodiment are performed in steps S1302 and S1303.

In step S1304, a person's face is detected as described in the first embodiment. A processed image stored in a memory 112 and a resolution-converted digital image stored in a status determination memory 104 are generated from the same image obtained by a video input unit 105. Thus, a face position in the processed image stored in the memory 112 can be specified using the face position detected by a status determination unit 103.

In step S1305, an exposure value for the AF (Automatic Focus) operation and AE (Automatic Exposure) operation is calculated. At this time, the focus may be adjusted to the person's face position detected in step S1304, or the detected person's face may be exposed using the processed image stored in the memory 112.

In step S1306, closed eye recognition processing of persons 1400 to 1402 as shown in FIG. 20 is done for person's faces detected in step S1304.

As disclosed in, e.g., Japanese Patent Laid-Open No. 8-266468, the closed eye recognition processing is to binarize a digital image, calculate the area of the iris including the pupil or the diameter in the opening/closing direction of the lids, and recognize a closed eye from the calculation result.

If it is determined in step S1307 that the eyes of all objects are open as shown in FIG. 20, the external memory 111 holds, in step S1308, the processed image as a still image obtained by executing automatic image capturing.

If it is determined in step S1307 that the eyes of all objects are not open, a control unit 100 determines in step S1309 whether it has received a signal from a timer 118.

If the control unit 100 has received a signal from the timer 108, the sign generation unit 106 gives a shooting sign using a flash or the like in step S1310. Then, an image is shot in step S1311. In step S1308, the external memory 111 holds the shot image as a still image obtained by executing automatic image capturing.

If the control unit 100 determines in step S1309 that it has not received any signal from the timer 108, the process returns to step S1303 to process the next image.

As described above, the fifth embodiment can avoid a situation in which no image is shot or a very long time is taken to perform automatic image capturing when an image is automatically captured by recognizing an object status from an image.

Other Embodiments

The object of each embodiment is achieved even by the following method. That is, a storage medium (or recording medium) which stores software program codes for implementing the functions of the above-described embodiments is supplied to the system or apparatus. The computer (or CPU or MPU) of the system or apparatus reads out and executes the program codes stored in the storage medium. In this case, the program codes read out from the storage medium implement the functions of the above-described embodiments by themselves, and the storage medium which stores the program codes constitutes the present invention. In addition to the case in which the functions of the above-described embodiments are implemented when the computer executes the readout program codes, the present invention incorporates the following case. That is, the functions of the above-described embodiments are implemented when the operating system (OS) or the like running on the computer performs part or all of actual processing on the basis of the instructions of the program codes.

The present invention also incorporates the following case. That is, the program codes read out from the storage medium are written in the memory of a function expansion card inserted into the computer or a function expansion unit connected to the computer. After that, the functions of the above-described embodiments are implemented when the CPU of the function expansion card or function expansion unit performs part or all of actual processing on the basis of the instructions of the program codes.

When the present invention is applied to the storage medium, the storage medium stores program codes corresponding to the above-described procedures.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-312127, filed Nov. 17, 2006, which is hereby incorporated by reference herein in its entirety.

What is claimed is:

1. An image capturing apparatus comprising:
    an image input unit which photo-electrically converts an object image to generate an image signal;
    a status determination unit which determines an object status in an image generated by said image input unit;
    an automatic image capturing instruction unit which starts an automatic image capturing operation as an operation to automatically store the image generated by said image input unit in a first storage unit when the object status determined by said status determination unit satisfies a predetermined automatic image capturing condition before lapse of a predetermined time after said automatic image capturing instruction unit designates the automatic image capturing operation; and
    a shooting control unit which automatically stores the image generated by said image input unit in a second storage unit after said automatic image capturing instruction unit designates the automatic image capturing operation,
    wherein when the object status does not satisfy the automatic image capturing condition even upon lapse of the predetermined time after said automatic image capturing instruction unit designates the automatic image capturing operation, said shooting control unit selects, without user intervention, an image captured in an image capturing condition closest to the automatic image capturing condition from images which are obtained till lapse of the predetermined time and stored in the second storage unit, and stores the selected image in the first storage unit.

2. The apparatus according to claim 1, wherein when the object status does not satisfy the automatic image capturing condition even upon lapse of the predetermined time after said automatic image capturing instruction unit designates the automatic image capturing operation, said shooting control unit causes said image input unit to perform a shooting operation and generate a shot image by closing a shutter which shields said image input unit from incident light, said shooting control unit selects an image captured in an image capturing condition closest to the automatic image capturing condition from images which are stored in the second storage unit, and said shooting control unit stores, in the first storage unit, an image captured in an image capturing condition closer to the automatic image capturing condition from the shot image and selected image.

3. The apparatus according to claim 1, wherein the automatic image capturing operation includes an operation to store, in the first storage unit, an image which satisfies the automatic image capturing condition, among images which are sequentially generated by said image input unit and stored in the second storage unit.

4. The apparatus according to claim 1, further comprising a start sign generation unit which gives a sign to an object or a photographer before performing an operation to store an image generated by said image input unit in the first storage unit.

5. The apparatus according to claim 1, further comprising an end sign generation unit which gives a sign to an object or a photographer after performing an operation to store an image generated by said image input unit in the first storage unit.

6. The apparatus according to claim 1, wherein said status determination unit determines a status of at least one person in the image.

7. The apparatus according to claim 6, wherein said status determination unit determines at least one status among a face expression, action, posture, and pose of the person.

8. The apparatus according to claim 6, wherein said status determination unit determines a status of the person in an image having a resolution different from a resolution of an image stored in the first storage unit.

9. A method of controlling an image capturing apparatus having an image input unit which photo-electrically converts an object image to generate an image signal, the method comprising:

a status determination step of determining an object status in an image generated by the image input unit;

an automatic image capturing instruction step of starting an automatic image capturing operation as an operation to automatically store the image generated by the image input unit in a first storage unit when the object status determined in the status determination step satisfies a predetermined automatic image capturing condition before lapse of a predetermined time after said automatic image capturing instruction step designates the automatic image capturing operation; and a shooting control step of automatically storing the image generated by the image input unit in a second storage unit after the automatic image capturing operation is designated in the automatic image capturing instruction step, wherein in the shooting control step, when the object status does not satisfy the automatic image capturing condition even upon lapse of the predetermined time after the automatic image capturing operation is designated in the automatic image capturing instruction step, an image captured in an image capturing condition closest to the automatic image capturing condition is selected, without user intervention, from images which are obtained till lapse of the predetermined time and stored in the second storage unit, and selected image is stored in the first storage unit.

10. A non-transitory computer-readable storage medium which stores a program causing a computer to execute the control method defined in claim 9.

* * * * *